(12) United States Patent
Ohkawa

(10) Patent No.: US 11,644,670 B2
(45) Date of Patent: May 9, 2023

(54) IMAGE DISPLAY APPARATUS

(71) Applicant: SONY CORPORATION, Tokyo (JP)

(72) Inventor: Shingo Ohkawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 138 days.

(21) Appl. No.: 16/769,906

(22) PCT Filed: Dec. 6, 2018

(86) PCT No.: PCT/JP2018/044953
§ 371 (c)(1),
(2) Date: Jun. 4, 2020

(87) PCT Pub. No.: WO2019/117014
PCT Pub. Date: Jun. 20, 2019

(65) Prior Publication Data
US 2020/0386996 A1 Dec. 10, 2020

(30) Foreign Application Priority Data
Dec. 15, 2017 (JP) .............................. JP2017-240269

(51) Int. Cl.
*G02B 27/01* (2006.01)
*H04N 13/346* (2018.01)
(Continued)

(52) U.S. Cl.
CPC ....... *G02B 27/0172* (2013.01); *G02B 6/0239* (2013.01); *G02B 21/04* (2013.01);
(Continued)

(58) Field of Classification Search
CPC ............ G02B 27/0172; G02B 27/0176; H04N 13/236; H04N 13/383; H04N 13/346
See application file for complete search history.

(56) References Cited

U.S. PATENT DOCUMENTS 6,097,353 A    8/2000  Melville et al.
2002/0051118 A1  5/2002  Takagi et al.
(Continued)

FOREIGN PATENT DOCUMENTS

CN  102959457 A  3/2013
CN  106353885 A  1/2017
(Continued)

OTHER PUBLICATIONS

Office Action of CN for Patent Application No. 201880079153.6, dated Nov. 24, 2021, 08 pages of English Translation and 08 pages of Office Action.
(Continued)

Primary Examiner — Ryan D Howard
(74) Attorney, Agent, or Firm — Chip Law Group

(57) ABSTRACT

An image display apparatus according to the present invention includes an image light generator (100) that emits image light, a first reflection element (11) that the image light from the image light generator (100) is to enter, the first reflection element (11) having a transmitting action and a reflecting action on the image light, a second reflection element (12) that reflects, toward the first reflection element (11), the image light that has entered via the first reflection element (11) and causes the image light to re-enter the first reflection element (11), the second reflection element (12) having a reflecting action on the image light, a light-condensing optical system (20) that converges, toward a position of a pupil of an observer, the image light that has re-entered the first reflection element (11), and a controller (40) that controls a placement angle of the first reflection element (11), the second reflection element (12), or both on the basis of the position of the pupil of the observer.

19 Claims, 24 Drawing Sheets

(51) Int. Cl.
    *G02B 27/30*     (2006.01)
    *H04N 13/366*     (2018.01)
    *G02B 6/02*     (2006.01)
    *H04N 13/236*     (2018.01)
    *G02B 21/04*     (2006.01)
    *G02B 27/08*     (2006.01)
    *H04N 13/383*     (2018.01)
    *G02B 27/18*     (2006.01)

(52) U.S. Cl.
    CPC ......... *G02B 27/0176* (2013.01); *G02B 27/08* (2013.01); *G02B 27/18* (2013.01); *G02B 27/30* (2013.01); *H04N 13/236* (2018.05); *H04N 13/346* (2018.05); *H04N 13/366* (2018.05); *H04N 13/383* (2018.05)

(56) References Cited

U.S. PATENT DOCUMENTS

| | | |
|---|---|---|
| 2002/0175880 A1 | 11/2002 | Charles et al. |
| 2008/0151185 A1 | 6/2008 | Yoshihiro et al. |
| 2008/0212195 A1* | 9/2008 | Yamamoto ......... G02B 27/0093 359/630 |
| 2013/0114146 A1 | 5/2013 | Brent |

FOREIGN PATENT DOCUMENTS

| | | |
|---|---|---|
| EP | 1053539 A1 | 11/2000 |
| EP | 2590002 A1 | 5/2013 |
| JP | 2000-131693 A | 5/2000 |
| JP | 2001-305477 A | 10/2001 |
| JP | 2002-509293 A | 3/2002 |
| JP | 2002-131693 A | 5/2002 |
| JP | 2002-162598 A | 6/2002 |
| JP | 2008-145701 A | 6/2008 |
| KR | 10-2001-0034024 A | 4/2001 |
| WO | 99/036903 A1 | 7/1999 |

OTHER PUBLICATIONS

International Search Report and Written Opinion of PCT Application No. PCT/JP2018/044953, dated Feb. 19, 2019, 09 pages of ISRWO.

* cited by examiner

[FIG. 21]
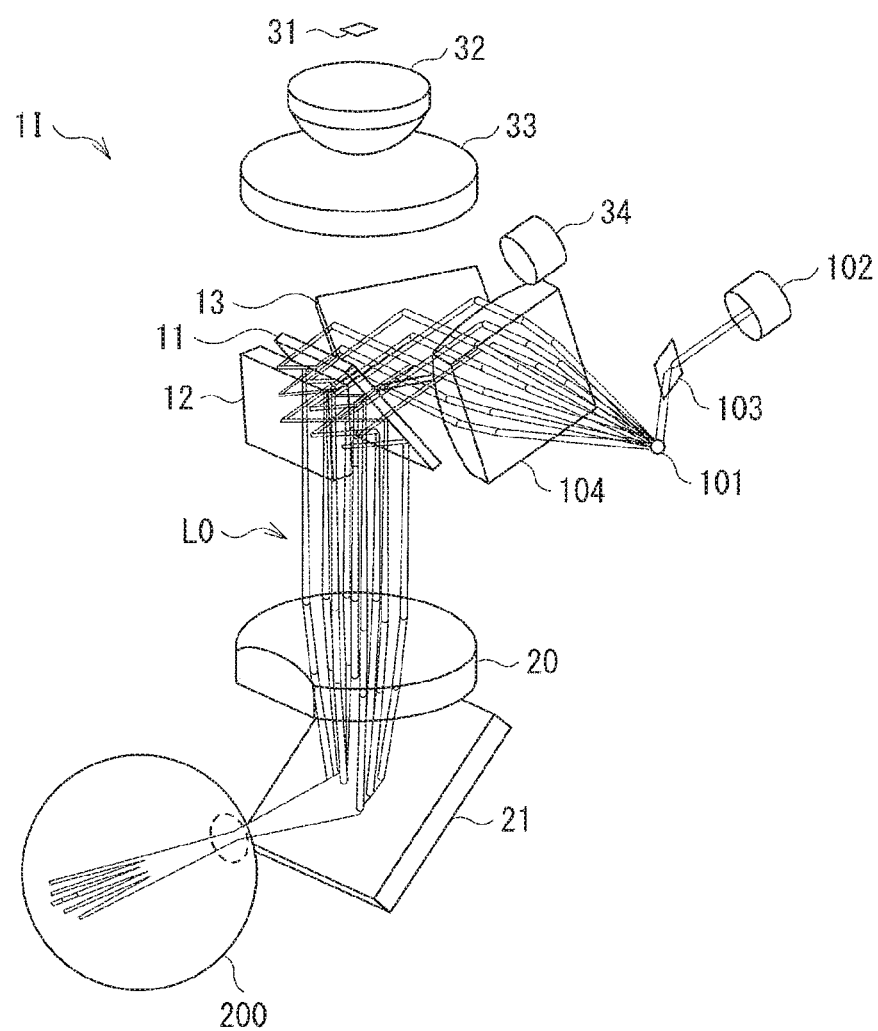

[FIG. 22]
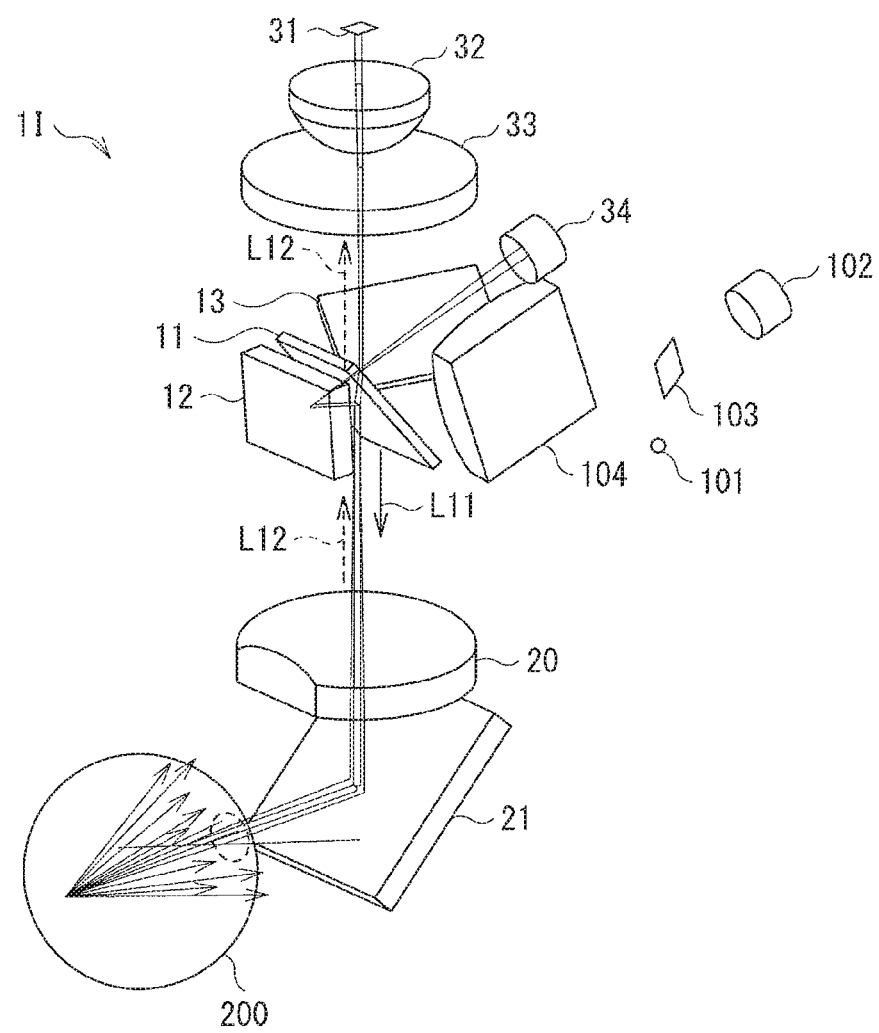

[FIG. 23]
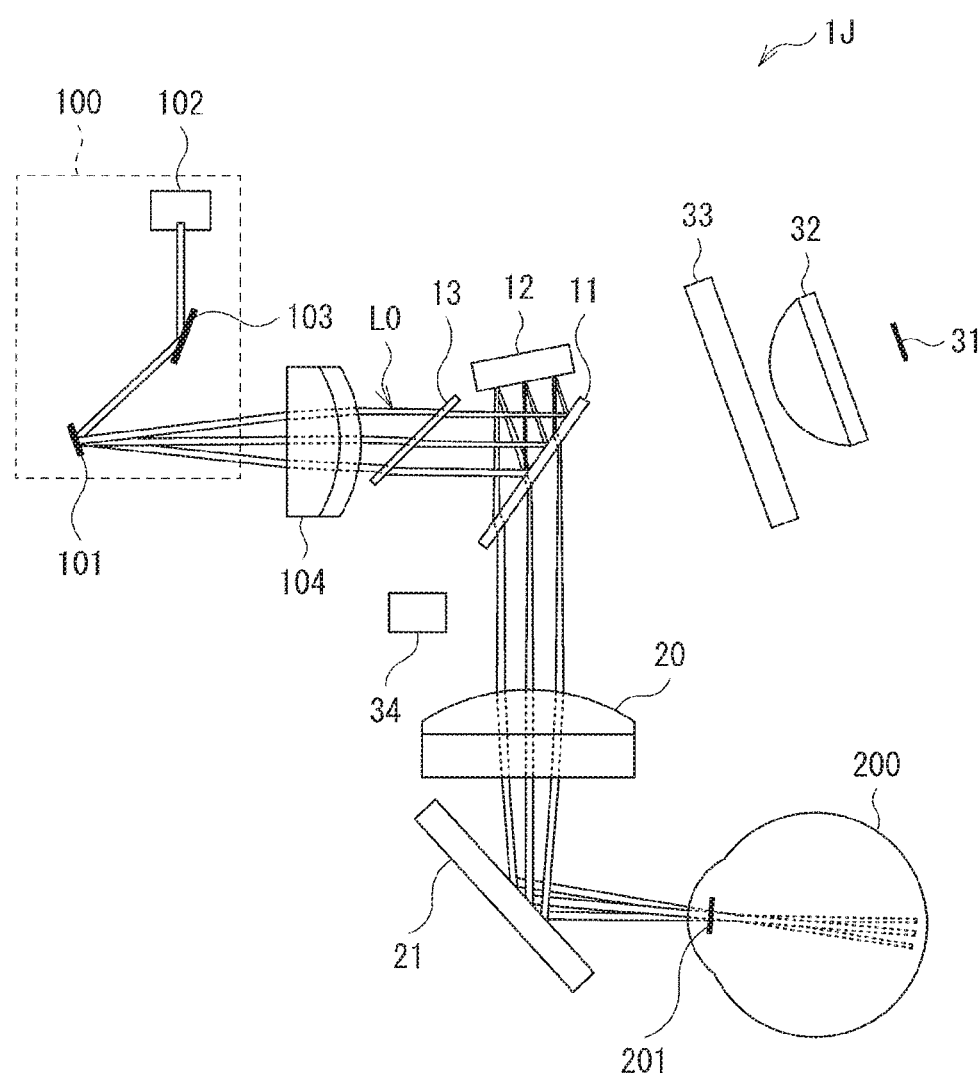

[FIG. 24]
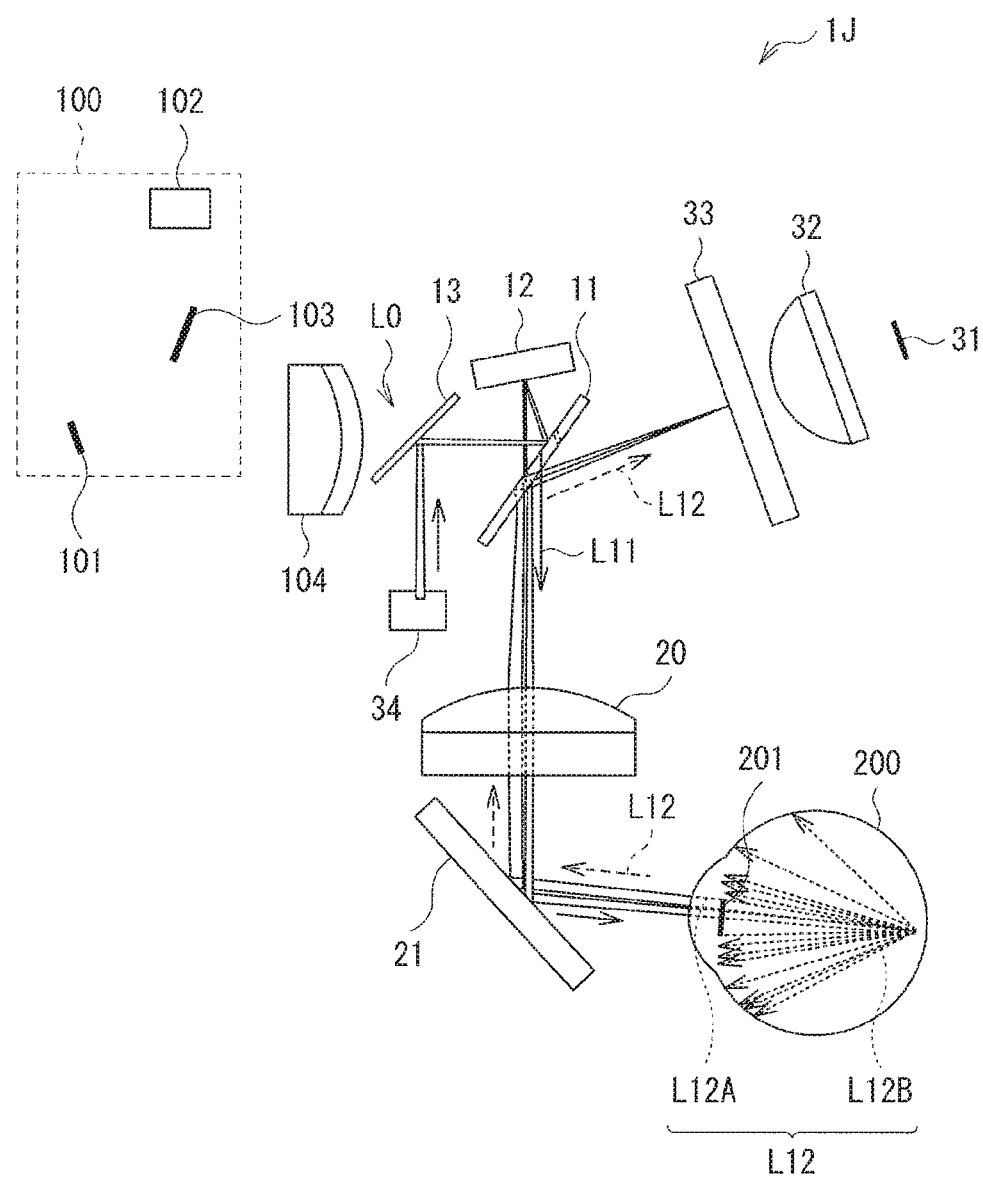

IMAGE DISPLAY APPARATUS

CROSS REFERENCE TO RELATED APPLICATIONS

This application is a U.S. National Phase of International Patent Application No. PCT/JP2018/044953 filed on Dec. 6, 2018, which claims priority benefit of Japanese Patent Application No. JP 2017-240269 filed in the Japan Patent Office on Dec. 15, 2017. Each of the above-referenced applications is hereby incorporated herein by reference in its entirety.

TECHNICAL FIELD

The present disclosure relates to an image display apparatus that guides image light to an eye of an observer.

BACKGROUND ART

An image display apparatus that generates image light by scanning, using a scanning unit, light from a light source and guides the generated image light to a eye of an observer has been developed. For example, such an image display apparatus is used as a head mounted display. In such an image display apparatus, to guide image light to the eye of the observer irrespective of a position of a pupil of the observer, a method of causing a scanning unit to move in accordance with a movement of the position of the pupil of the observer is suggested (see PTL 1).

CITATION LIST

Patent Literature

PTL 1: Japanese Unexamined Patent Application Publication No. 2008-145701

SUMMARY OF THE INVENTION

In a method of causing a scanning unit to move as described above, it is difficult to reduce a size of a moving mechanism, which leads to an increase in a size of an image display apparatus as a whole.

It is desirable to provide an image display apparatus that is compact and able to guide image light to a pupil of an observer irrespective of a movement of a position of the pupil.

An image display apparatus according to an embodiment of the present disclosure includes an image light generator that emits image light, a first reflection element that the image light from the image light generator is to enter, the first reflection element having a transmitting action and a reflecting action on the image light, a second reflection element that reflects, toward the first reflection element, the image light that has entered via the first reflection element and causes the image light to re-enter the first reflection element, the second reflection element having a reflecting action on the image light, a light-condensing optical system that converges, toward a position of a pupil of an observer, the image light that has re-entered the first reflection element, and a controller that controls a placement angle of the first reflection element, the second reflection element, or both on a basis of the position of the pupil of the observer.

In the image display apparatus according to an embodiment of the present disclosure, the image light from the image light generator enters the first reflection element. The second reflection element reflects, toward the first reflection element, the image light that has entered via the first reflection element and causes the image light to re-enter the first reflection element. The light-condensing optical system converges, toward the position of the pupil of the observer, the image light that has re-entered the first reflection element. The placement angle of the first reflection element, the second reflection element, or both is controlled on the basis of the position of the pupil of the observer.

BRIEF DESCRIPTION OF THE DRAWINGS

FIG. 21 is a first perspective view that illustrates a modification example of the image display apparatus according to the third embodiment along with an optical path of image light.

FIG. 22 is a second perspective view that illustrates a modification example of the image display apparatus according to the third embodiment along with an optical path of illumination light for detecting a position of a pupil.

FIG. 23 is a configuration diagram that illustrates an example of a configuration of an image display apparatus according to a fourth embodiment along with an optical path of image light.

FIG. 24 is a configuration diagram that illustrates an example of the configuration of the image display apparatus according to the fourth embodiment along with an optical path of illumination light for detecting a position of a pupil.

MODES FOR CARRYING OUT THE INVENTION

In the following, embodiments of the present disclosure are described with reference to drawings. It is to be noted that the description is given in the following order.
1. First Embodiment (FIGS. 1 to 11)
1.1 Configuration and Operation
1.2 Effects
2. Second Embodiment (FIGS. 12 to 16)
3. Third Embodiment (FIGS. 17 to 22)
4. Fourth Embodiment (FIGS. 23 to 24)
5. Other Embodiments

1. First Embodiment

1.1 Configuration and Operation

Figure 1:
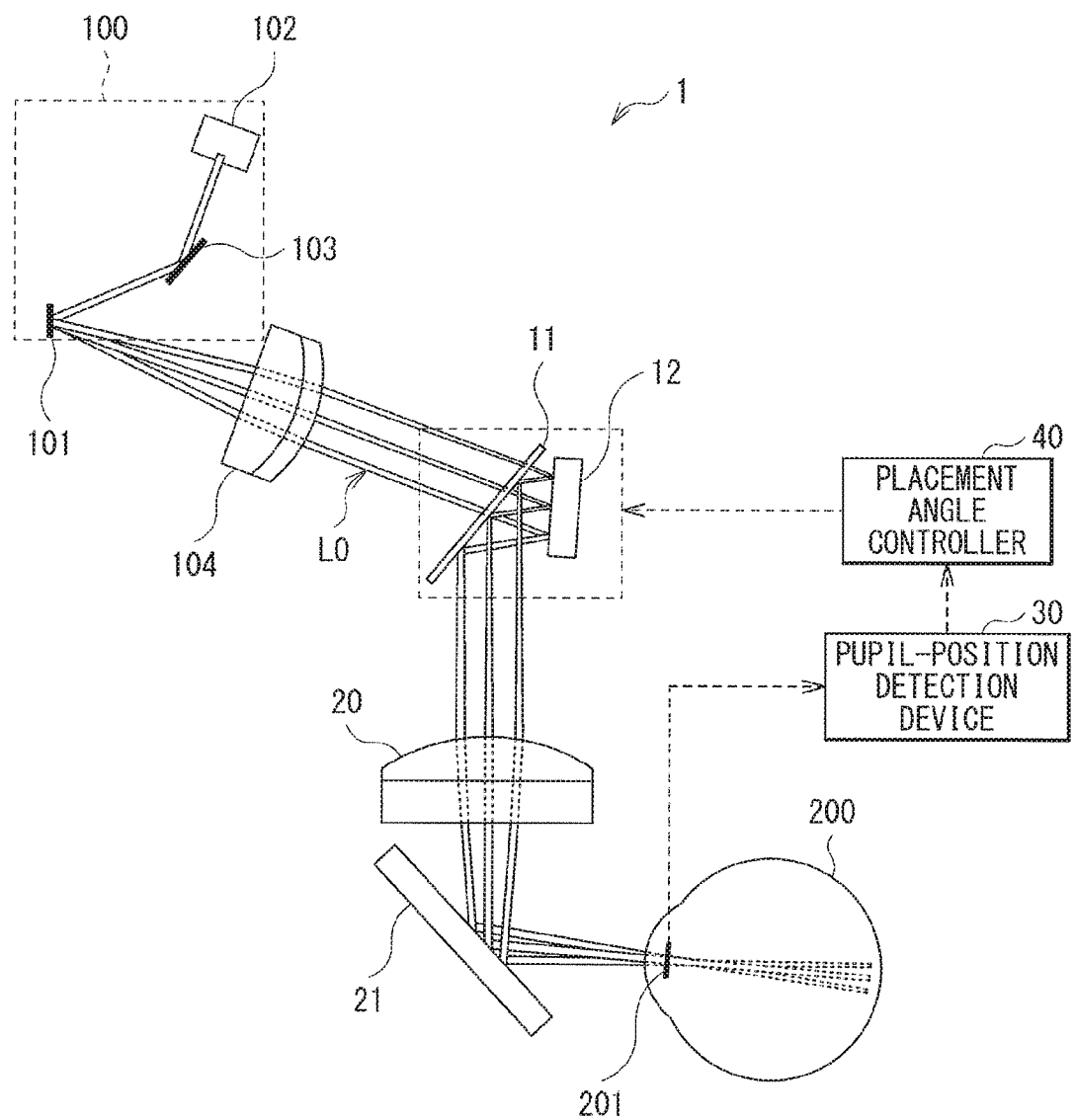
FIG. 1 is a configuration diagram that roughly illustrates an example of a configuration of an image display apparatus according to a first embodiment of the present disclosure.

FIG. 1 roughly illustrates an example of a configuration of an image display apparatus 1 according to a first embodiment of the present disclosure.

The image display apparatus 1 according to the first embodiment includes an image light generator 100 that generates image light L0. The image display apparatus 1 is an apparatus that guides the image light L0 generated by the image light generator 100 to a position of a pupil of an observer. For example, the image display apparatus 1 is usable as a head mounted display.

The image display apparatus 1 further includes a first reflection element 11, a second reflection element 12, a light-condensing optical system 20, a half mirror 21, a pupil-position detection device 30, a placement angle controller 40, and a collimator lens 104.

The image light generator 100 generates the image light L0 and emits the generated image light L0. The image light generator 100 includes a scanning mirror 101, a drawing light source 102, and a total reflection mirror 103.

For example, the drawing light source 102 is a laser light source including a laser diode. The drawing light source 102 may include a plurality of laser diodes each emitting light having a corresponding one of R (red), G (green), and B (blue). The drawing light source 102 outputs, toward the scanning mirror 101, laser light that is intensity-modulated on the basis of image data. Between the drawing light source 102 and the scanning mirror 101, an optical system that guides the laser light from the drawing light source 102 to the scanning mirror 101 may be provided.

For example, the scanning mirror 101 includes a MEMS (Micro Electro Mechanical Systems) mirror. The scanning mirror 101 scans the laser light from the drawing light source 102 two-dimensionally on the basis of the image data, thereby generating the two-dimensional image light L0. A scanning direction and scanning timing of the scanning mirror 101 are controlled on the basis of the image data.

It is to be noted that the image light generator 100 is not limited to a laser-scanning device using such drawing light source 102 and scanning mirror 101, and may also be a device that uses a display panel and a pinhole. For example, the image light generator 100 may be a device that condenses on the pinhole, using a condensing lens, image light from a display panel such as a liquid crystal display (LCD) or an organic electroluminescence display (OELD) and outputs the condensed image light toward the collimator lens 104.

The collimator lens 104 collimates a travelling direction of a beam from each pixel in the image light generator 100, to cause the beam to enter the first reflection element 11 as the image light L0.

The first reflection element 11 is a half mirror having a transmitting action and a reflecting action on the image light L0. The image light L0 from the image light generator 100 enters the second reflection element 12 via the first reflection element 11.

The second reflection element 12 is a total reflection mirror having a reflecting action on the image light L0. The second reflection element 12 reflects, toward the first reflection element 11, the image light L0 that has entered via the first reflection element 11, thereby causing the image light L0 to re-enter the first reflection element 11.

In the first embodiment, the second reflection element 12 is disposed on a first transmission optical path of the image light L0, the image light L0 having been emitted from the image light generator 100 and having transmitted through the first reflection element 11. The first reflection element 11 is disposed to reflect, toward the light-condensing optical system 20, the image light L0 that has been reflected by the second reflection element 12 and has re-entered the first reflection element 11.

The light-condensing optical system 20 is an optical system that converges, via the half mirror 21 toward the position of the pupil of the observer, the image light L0 that has re-entered the first reflection element 11. For example, the light-condensing optical system 20 includes at least one light-condensing element such as a condensing lens.

The half mirror 21 is disposed on an optical path between the light-condensing optical system 20 and the position of the pupil of the observer. The half mirror 21 is disposed to face an eyeball 200 of the observer. The observer is to observe the image light L0 via the half mirror 21. For example, in a case of configuring the image display apparatus 1 as a head mounted display, this makes it possible to observe the image light L0 generated by the image light generator 100 while allowing a see-through observation of an external world.

For example, as illustrated in a third embodiment (FIG. 18, etc.) to be described later, the pupil-position detection device 30 includes a detection element 31, and detects the position of the pupil of the observer on the basis of a result of a detection by the detection element 31.

The placement angle controller 40 controls a placement angle of the first reflection element 11, the second reflection element 12, or both on the basis of the position of the pupil of the observer, which is detected by the pupil-position detection device 30. This makes it possible to guide the image light L0 to a pupil 201 of the observer, irrespective of a movement of the position of the pupil of the observer.

(Modification Example of Light-Condensing Optical System 20)

Figure 2:
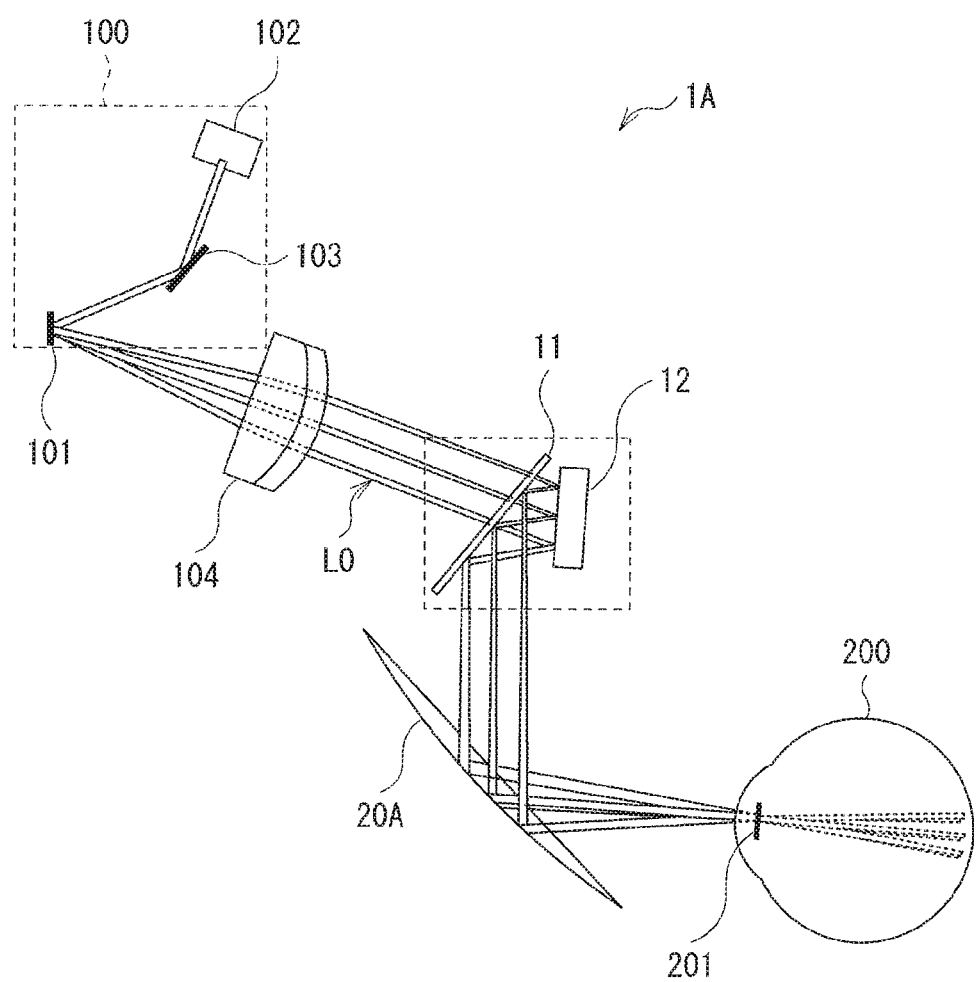
FIG. 2 is a configuration diagram that roughly illustrates a first modification example of a light-condensing optical system in the image display apparatus according to the first embodiment.

FIG. 2 roughly illustrates a first modification example of the light-condensing optical system 20 in the image display apparatus 1.

An image display apparatus 1A illustrated in FIG. 2 includes a light-condensing optical system 20A in place of the light-condensing optical system 20 and the half mirror 21 in the image display apparatus 1 in FIG. 1. The light-condensing optical system 20A is a concave half mirror, and has a configuration that shares, in common, the light-condensing optical system 20 and the half mirror 21 in the image display apparatus 1 in FIG. 1.

Figure 3:
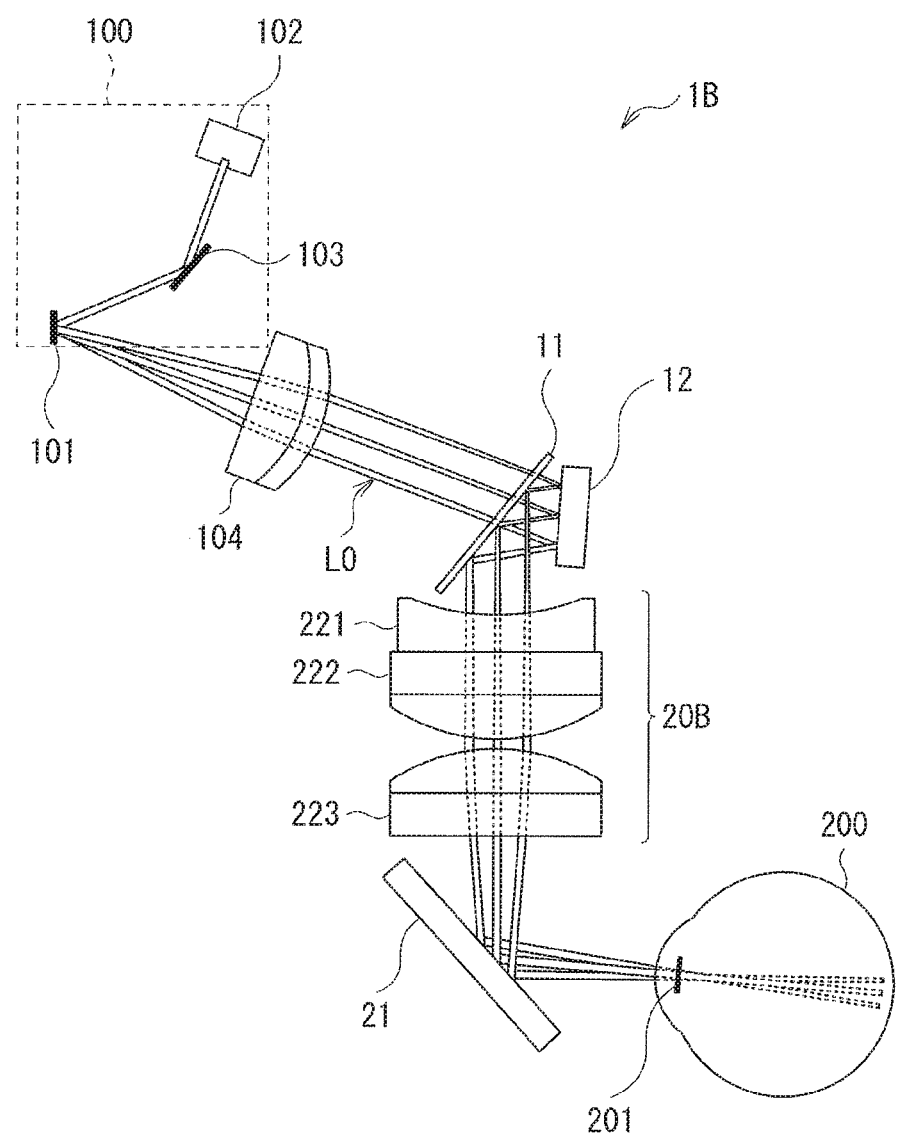
FIG. 3 is a configuration diagram that roughly illustrates a second modification example of the light-condensing optical system in the image display apparatus according to the first embodiment.

FIG. 3 roughly illustrates a second modification example of the light-condensing optical system 20 in the image display apparatus 1.

An image display apparatus 1B illustrated in FIG. 3 includes a light-condensing optical system 20B in place of the light-condensing optical system 20 in the image display apparatus 1 in FIG. 1. The light-condensing optical system 20B includes a plurality of light-condensing elements. For example, the light-condensing optical system 20B includes a concave lens 221, a convex lens 222, and a convex lens 223. It is preferable that the concave lens 221 include, to achieve achromatization, a material having a higher refractive index than a material included in the convex lens 222. Such a configuration of the light-condensing optical system 20B makes it possible to increase an angle of view and improve chromatic aberration as compared to the image display apparatus 1 in FIG. 1.

As another modification example of the light-condensing optical system 20, the light-condensing optical system 20 may be an optical system that includes a diffractive optical element.

(Example of Control of Placement Angle)

Figure 4:
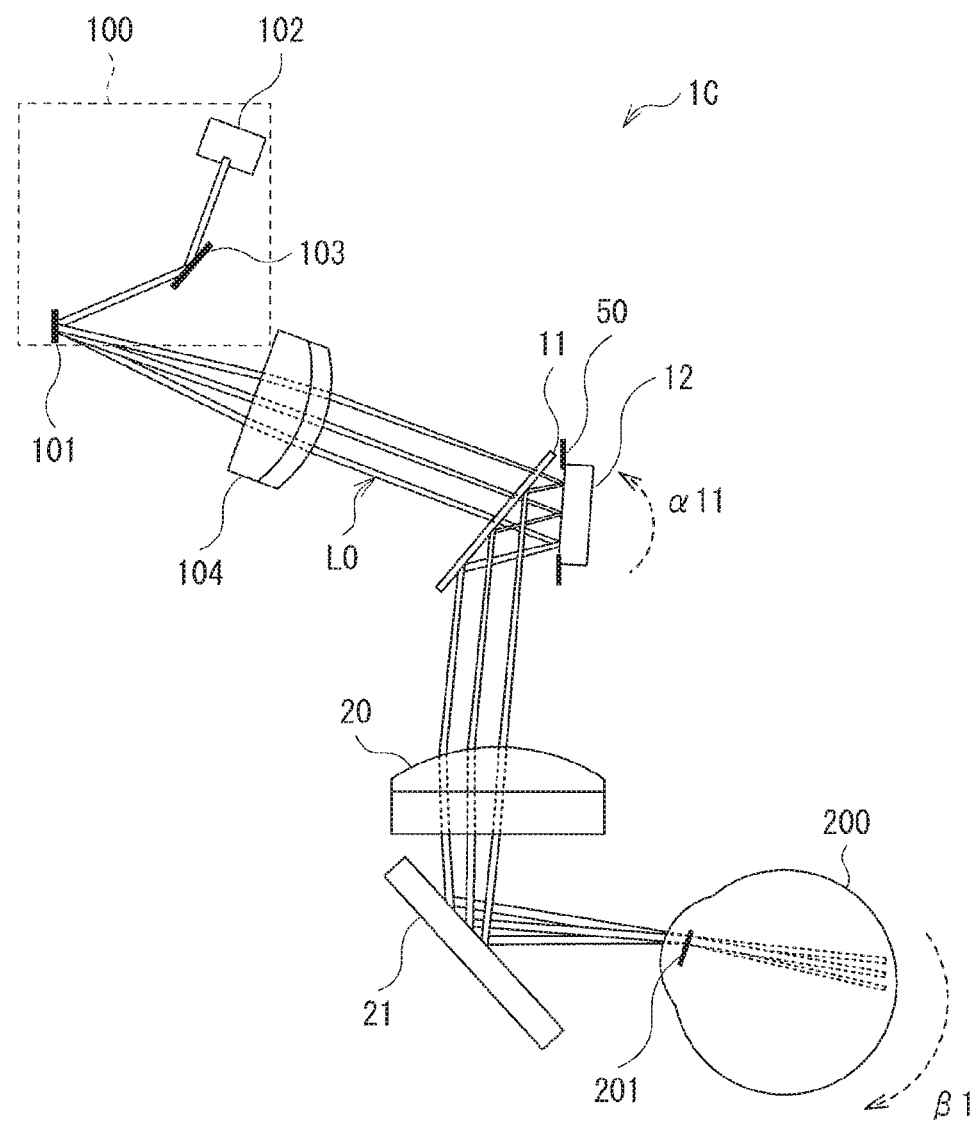
FIG. 4 is a configuration diagram that roughly illustrates an example of varying a placement angle of a second reflection element in a first direction in the image display apparatus according to the first embodiment.
Figure 5:
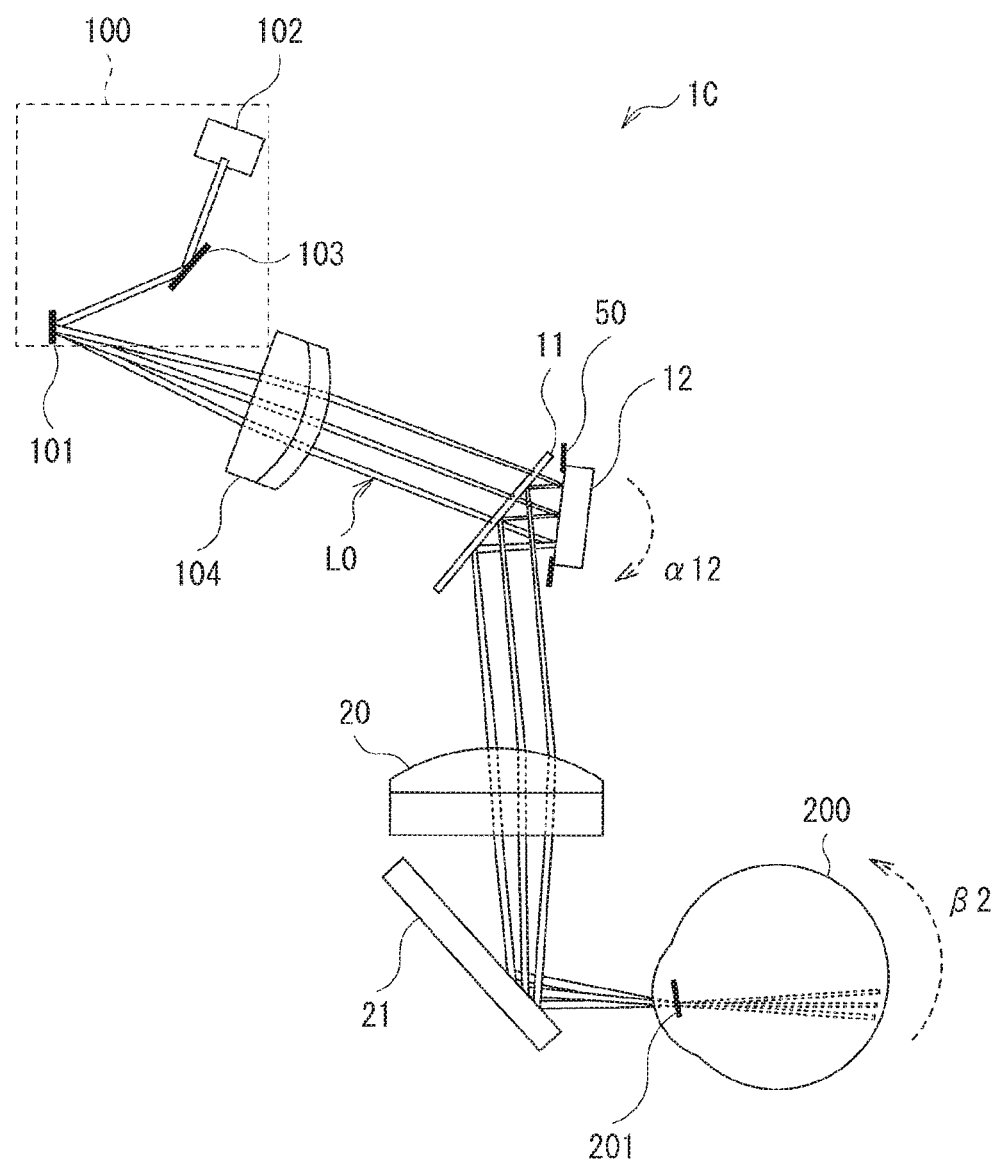
FIG. 5 is a configuration diagram that roughly illustrates an example of varying the placement angle of the second reflection element in a second direction in the image display apparatus according to the first embodiment.

FIGS. 4 and 5 each illustrate an example in which the second reflection element 12 has a variable placement angle in the image display apparatus 1 in FIG. 1.

In an image display apparatus 1C illustrated in FIGS. 4 and 5, the placement angle controller 40 controls the placement angle of the second reflection element 12 to cause the image light L0 to enter the pupil 201 of an observer irrespective of variation in the position of the pupil of the observer.

For example, as illustrated in FIG. 4, in a case where the eyeball 200 of the observer varies in a direction β1 and the position of the pupil varies upwardly, the placement angle controller 40 causes the placement angle of the second reflection element 12 to vary in a first direction α11 associated with the direction β1 of the variation in the position of the pupil.

In addition, as illustrated in FIG. 5, in a case where the eyeball 200 of the observer varies in a direction β2 and the position of the pupil varies downwardly, the placement angle controller 40 causes the placement angle of the second reflection element 12 to vary in a second direction α12 associated with the direction β2 of the variation in the position of the pupil.

Figure 6:
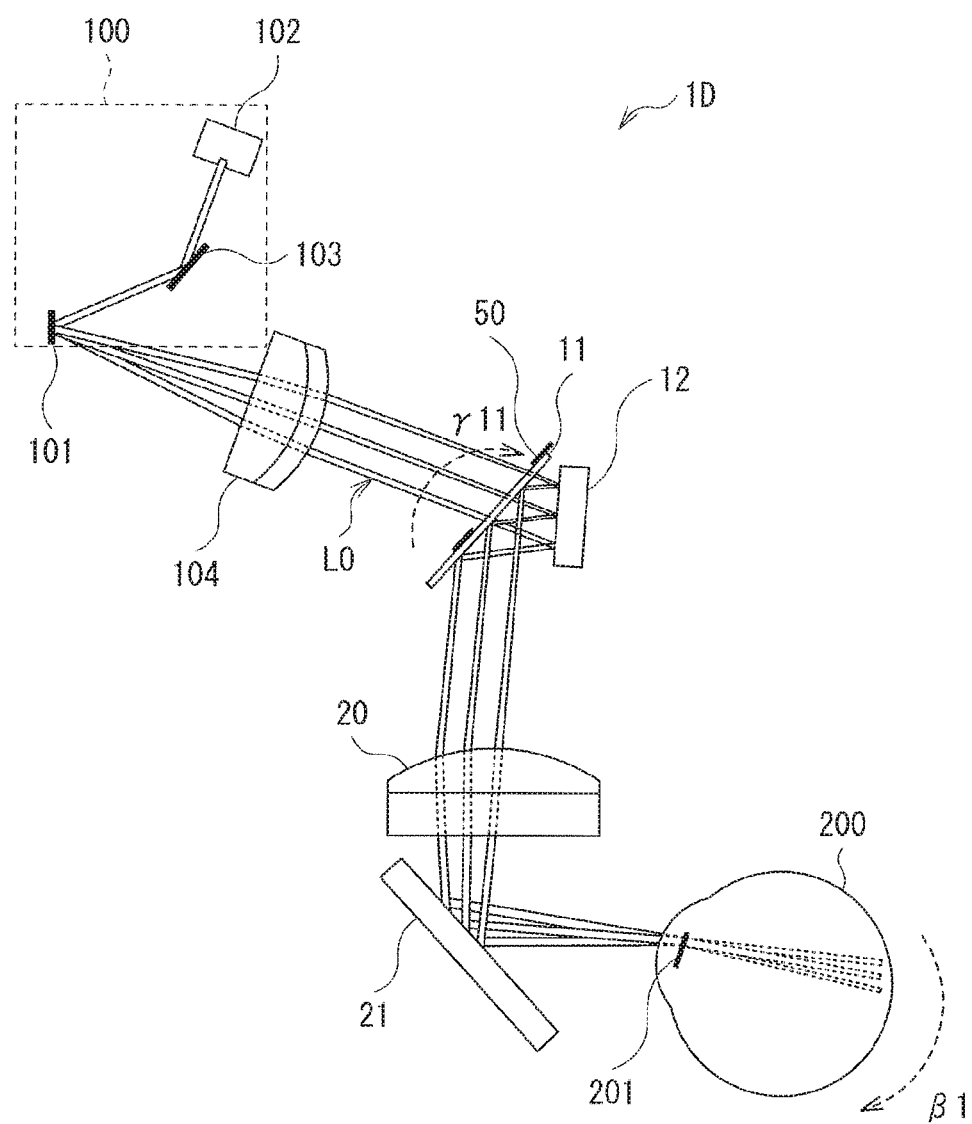
FIG. 6 is a configuration diagram that roughly illustrates an example of varying a placement angle of a first reflection element in the first direction in the image display apparatus according to the first embodiment.
Figure 7:
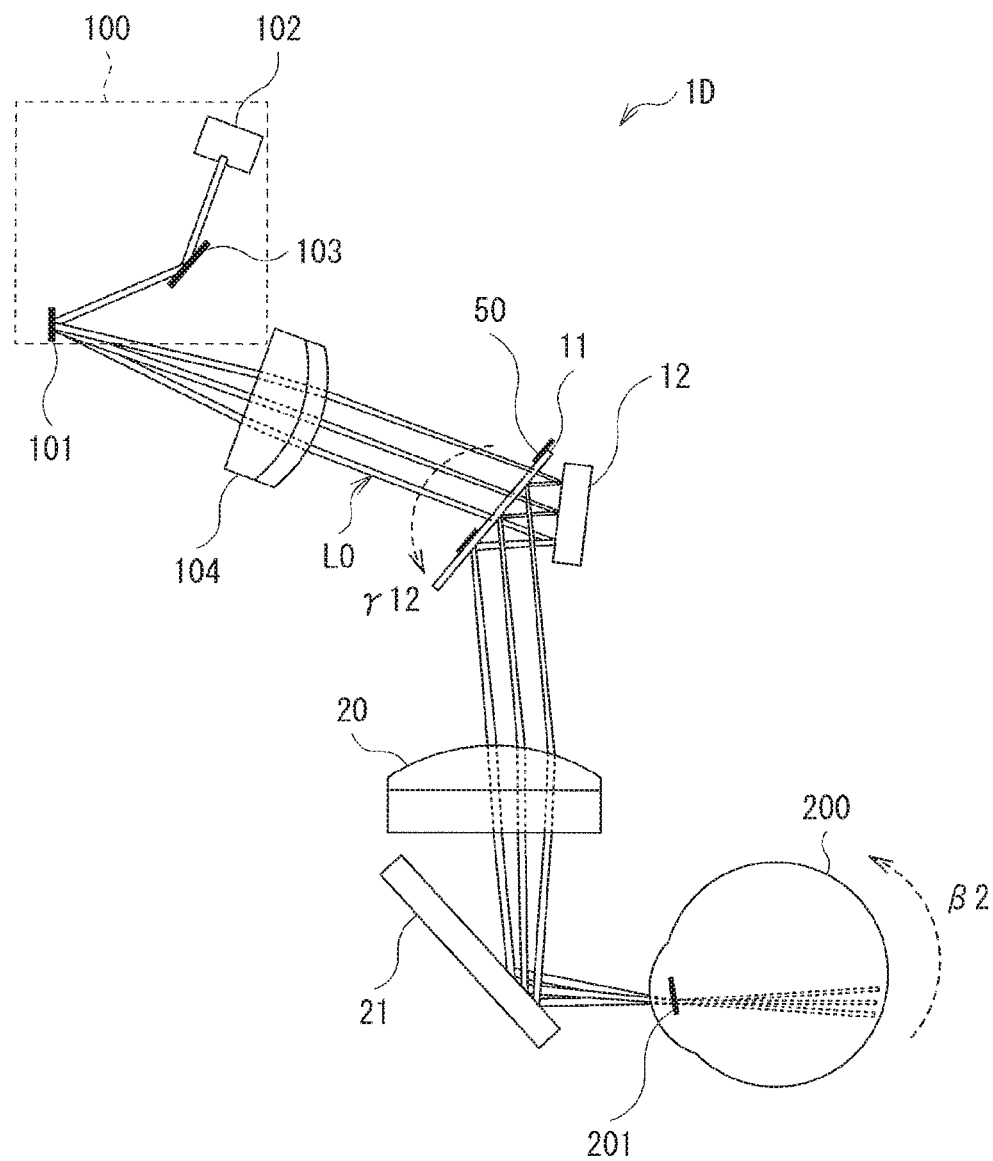
FIG. 7 is a configuration diagram that roughly illustrates an example of varying the placement angle of the first reflection element in the second direction in the image display apparatus according to the first embodiment.

FIGS. 6 and 7 each illustrate an example in which the first reflection element 11 has a variable placement angle in the image display apparatus 1 in FIG. 1.

In an image display apparatus 1D illustrated in FIGS. 6 and 7, the placement angle controller 40 controls the placement angle of the first reflection element 11 to cause the image light L0 to enter the pupil 201 of the observer irrespective of variation in the position of the pupil of the observer.

For example, as illustrated in FIG. 6, in a case where the eyeball 200 of the observer varies in the direction β1 and the position of the pupil varies upwardly, the placement angle controller 40 causes the placement angle of the first reflection element 11 to vary in a first direction γ11 associated with the direction β1 of the variation in the position of the pupil.

In addition, as illustrated in FIG. 7, in a case where the eyeball 200 of the observer varies in the direction β2 and the position of the pupil varies downwardly, the placement angle controller 40 causes the placement angle of the first reflection element 11 to vary in a second direction γ12 associated with the direction β2 of the variation in the position of the pupil.

It is to be noted that in FIGS. 4 to 7, the position of the pupil may vary not only within a paper surface but also in a direction that intersects with the paper surface. In this case, the placement angle of the first reflection element 11 or the second reflection element 12 may be varied in the direction that intersects with the paper surface, in accordance with the direction of the variation in the position of the pupil.

In addition, the first reflection element 11 and the second reflection element 12 may each have a variable placement angle. The placement angle controller 40 may control the placement angles of both the first reflection element 11 and the second reflection element 12 to cause the image light L0 to enter the pupil 201 of the observer irrespective of variation in the position of the pupil of the observer.

(Spread Angle of Image Light)

Figure 8:
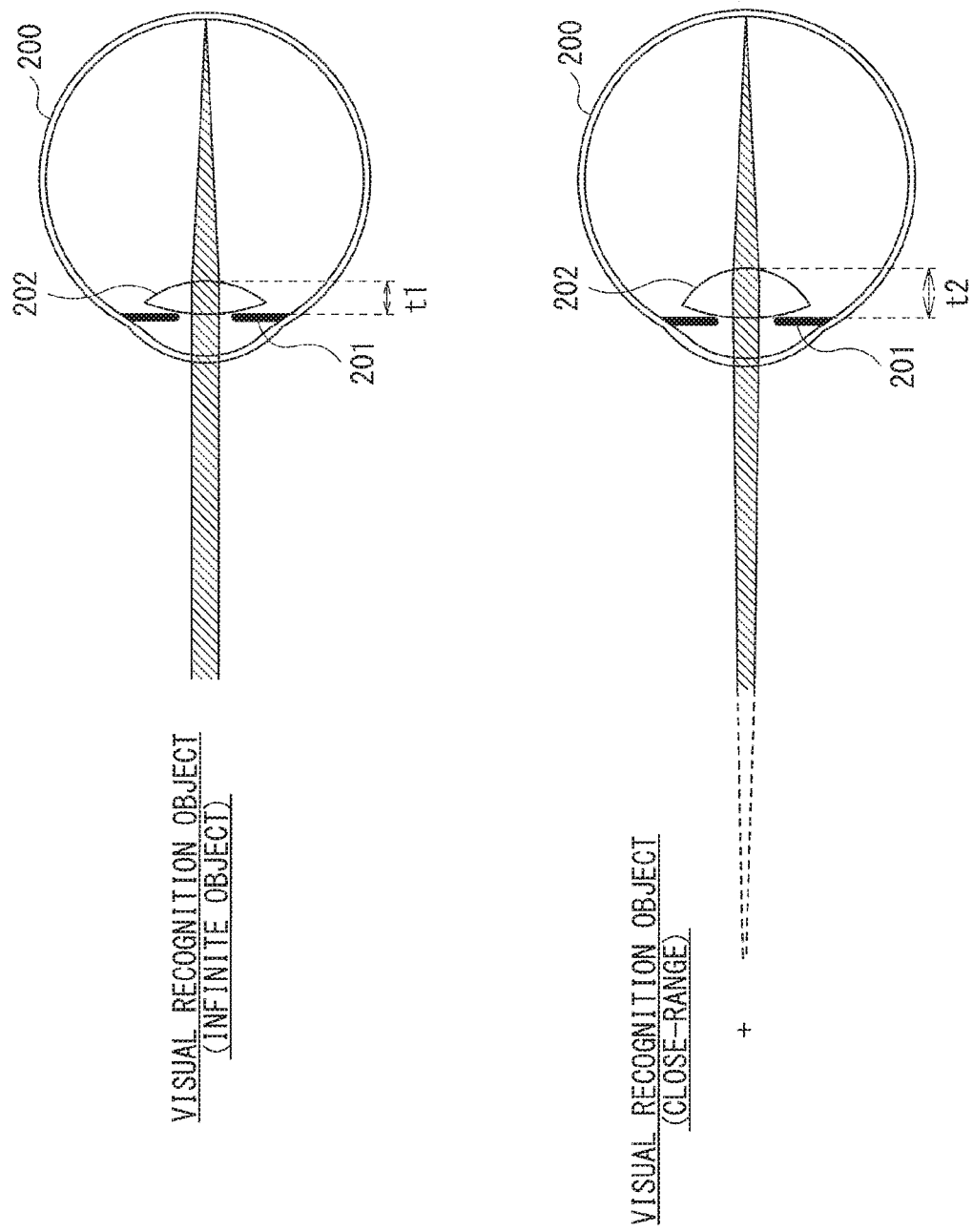
FIG. 8 is an explanatory diagram that schematically illustrates variation in a crystalline lens of an eyeball depending on a difference in a visual recognition distance.

FIG. 8 schematically illustrates variation in the crystalline lens 202 of the eyeball 200 depending on a difference in a distance from a visual recognition object (visual recognition distance).

In a case where the image display apparatus 1 according to the first embodiment visually recognizes not only the image light L0 but also the external world through the half mirror 21, the crystalline lens 202 is caused to vary in thickness in accordance with the distance from the visual recognition object in the external world, to allow an image to be formed on a retina. FIG. 8 schematically illustrates variation in the crystalline lens 202 in a case where the visual recognition distance is infinite (top) and a case where the visual recognition distance is close-range (bottom). In the case where the visual recognition distance is infinite, light from the visual recognition object enters the pupil 201 as approximately parallel light. In the case where the visual recognition distance is close-range, the light from the visual recognition object enters the pupil 201 as diverging light. Thus, a thickness t2 of the crystalline lens 202 in the case where the visual recognition distance is close-range becomes thicker than a thickness t1 of the crystalline lens 202 in the case where the visual recognition distance is infinite, to cause the light from the visual recognition object to form an image on the retina.

Thus, in the image display apparatus 1 according to the first embodiment, it is preferable that the image light L0 at the position of the pupil of the observer be close to a parallel beam toward the pupil 201 of the observer, or a diverging beam toward the pupil 201 of the observer.

Figure 9:
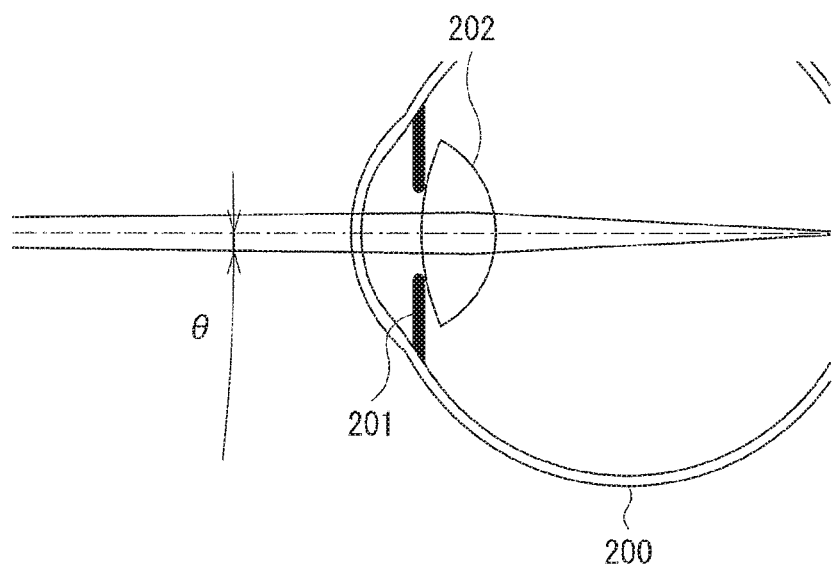
FIG. 9 is an explanatory diagram that schematically illustrates a spread angle of image light.

Here, FIG. 9 schematically illustrates a spread angle θ of the image light L0 entering the pupil 201. In the image display apparatus 1 according to the first embodiment, it is preferable that the spread angle θ of the image light L0 at the position of the pupil of the observer be within a range of the following Expression (1).

$$-0.06° < \theta < 0.6° \tag{1}$$

It is more preferable that the spread angle θ of the image light L0 at the position of the pupil of the observer be within a range of the following Expression (1)'.

$$0° < \theta < 0.60 \tag{1}'$$

However, it is assumed that the spread angle θ is positive in a case of diverging toward the pupil 201 of the observer, and that the spread angle θ is negative in a case of converging. In addition, as illustrated in FIG. 9, the spread angle θ is assumed to be a spread angle (half angle) from an optical axis.

It is to be noted that, for example, the spread angle θ of the image light L0 is adjustable by varying a position, on the optical path, of at least one of the drawing light source 102, the scanning mirror 101, the first reflection element 11, or the second reflection element 12. In addition, the spread angle θ of the image light L0 is also adjustable by varying a position of the collimator lens 104 on the optical path.

In addition, it is preferable to adjust a beam waist position of the image light L0 as follows. This makes it possible to adjust the spread angle θ of the image light L0 to be within the range described above.

As illustrated in FIGS. 4 and 5, in a case of the second reflection element 12 having a variable placement angle, it is preferable that the second reflection element 12 be disposed in a vicinity of a focal surface on image light generator 100 side in the light-condensing optical system 20. The focal surface on the image light generator 100 side in the light-condensing optical system 20 corresponds to an aperture stop position 50. It is to be noted that the illustrated aperture stop position 50 does not necessarily indicate that the aperture stop is physically provided, but merely indicates a position that corresponds to the aperture stop. The same applies to the aperture stop position 50 in the following other drawings. In this case, in the optical path of the image light L0 after being reflected by the second reflection element 12, it is preferable that the beam waist position of the image light L0 be at an optical-path position between the second reflection element 12 and the light-condensing optical system 20. Thus, it is preferable that the beam waist position of the image light L0 be in the vicinity of the second reflection element 12 or at a position closer to the pupil in the optical path of the image light L0 after being reflected by the second reflection element 12.

In addition, as illustrated in FIGS. 6 and 7, in a case of the first reflection element 11 having a variable placement angle, it is preferable that the first reflection element 11 be disposed in the vicinity of a focal surface on image light generator 100 side in the light-condensing optical system 20. The focal surface on the image light generator 100 side in the light-condensing optical system 20 corresponds to the aperture stop position 50. In this case, in the optical path of the image light L0, the image light L0 having been emitted from the image light generator 100 and having entered the first reflection element 11, it is preferable that the beam waist position of the image light L0 be at an optical-path position between the first reflection element 11 and the light-condensing optical system 20. Thus, it is preferable that the beam waist position of the image light L0 be in the vicinity of the first reflection element 11 or at a position closer to the pupil in the optical path of the image light L0 after being reflected by the first reflection element 11.

(Placement of First Reflection Element 11)

Figure 10:
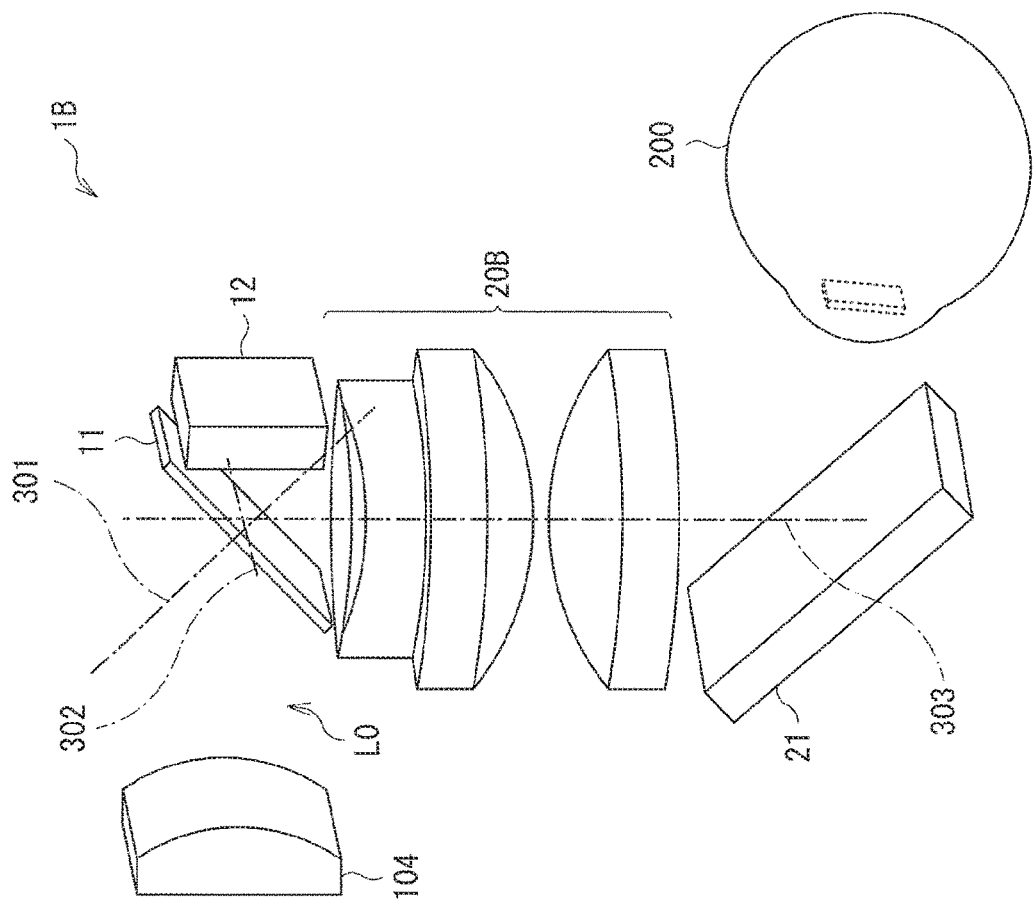
FIG. 10 is a first perspective view that schematically illustrates an example of a placement position of the first reflection element in the image display apparatus according to the first embodiment.
Figure 11:
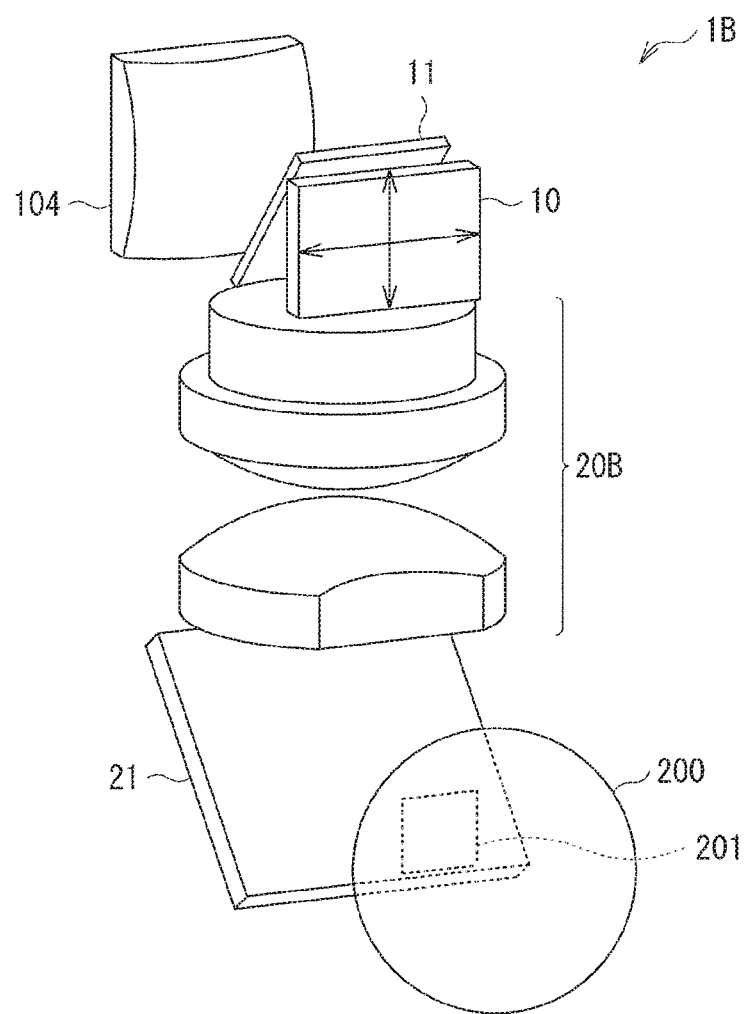
FIG. 11 is a second perspective view that schematically illustrates an example of the placement position of the first reflection element in the image display apparatus according to the first embodiment.

Next, with reference to FIGS. 10 and 11, a preferable placement position of the first reflection element 11 is described. It is to be noted that FIGS. 10 and 11 each illustrate an example of a three-dimensional placement of the image display apparatus 1B illustrated in FIG. 3.

With respect to the optical axis of the image light generator 100, a normal line 301 of the first reflection element 11 is inclined centering around an inclination reference axis 302 of the first reflection element 11. In addition, with respect to an entering optical axis 303 of the light-condensing optical system 20B, the normal line 301 of the first reflection element 11 is inclined centering around the inclination reference axis 302 of the first reflection element 11.

For example, a reflection functional surface in the second reflection element 12 is a rectangle having a length and a width different from each other. In this case, it is preferable that a long side of the reflection functional surface in the second reflection element 12 be approximately parallel to the inclination reference axis 302. Thus, even in a case of varying the placement angle of the first reflection element 11 or the second reflection element 12, it is possible to prevent an interference between the first reflection element 11 and the second reflection element 12 or an interference between the first reflection element 11 and another component.

1.2 Effects

As described above, according to the present embodiment, the placement angle of the first reflection element 11, the second reflection element 12, or both that are disposed on the optical path of the image light L0, the image light L0 having been emitted from the image light generator 100, is controlled on the basis of the position of the pupil of the observer, thereby making it possible to achieve compactness and to guide the image light L0 to the pupil 201 irrespective of a movement in the position of the pupil of the observer.

According to the present embodiment, as compared to a method of moving a scanning unit itself in the image light generator 100, it is possible to adjust the converging position of the image light L0 with a small amount of movement in accordance with the variation in the position of the pupil of the observer. In addition, the method of moving the scanning unit itself has a possibility of causing a deterioration in image quality such as image distortion. Whereas, according to the present embodiment, it is possible to adjust the converging position of the image light L0 while reducing the deterioration in image quality. In addition, according to the present embodiment, appropriate control is performed on the spread angle θ of the image light L0, thereby making it possible to perform image display having high resolution corresponding to the visual recognition distance of the observer.

It is to be noted that effects described in the present description are merely illustrative and are not limitative, and other effects may be provided. This applies similarly to the effects of the following other embodiments.

2. Second Embodiment

Next, an image display apparatus according to a second embodiment of the present disclosure is described. It is to be noted that in the following, the same reference numerals are assigned to approximately the same components as those in the image display apparatus according to the foregoing first embodiment, and descriptions thereof are omitted where appropriate.

Figure 12:
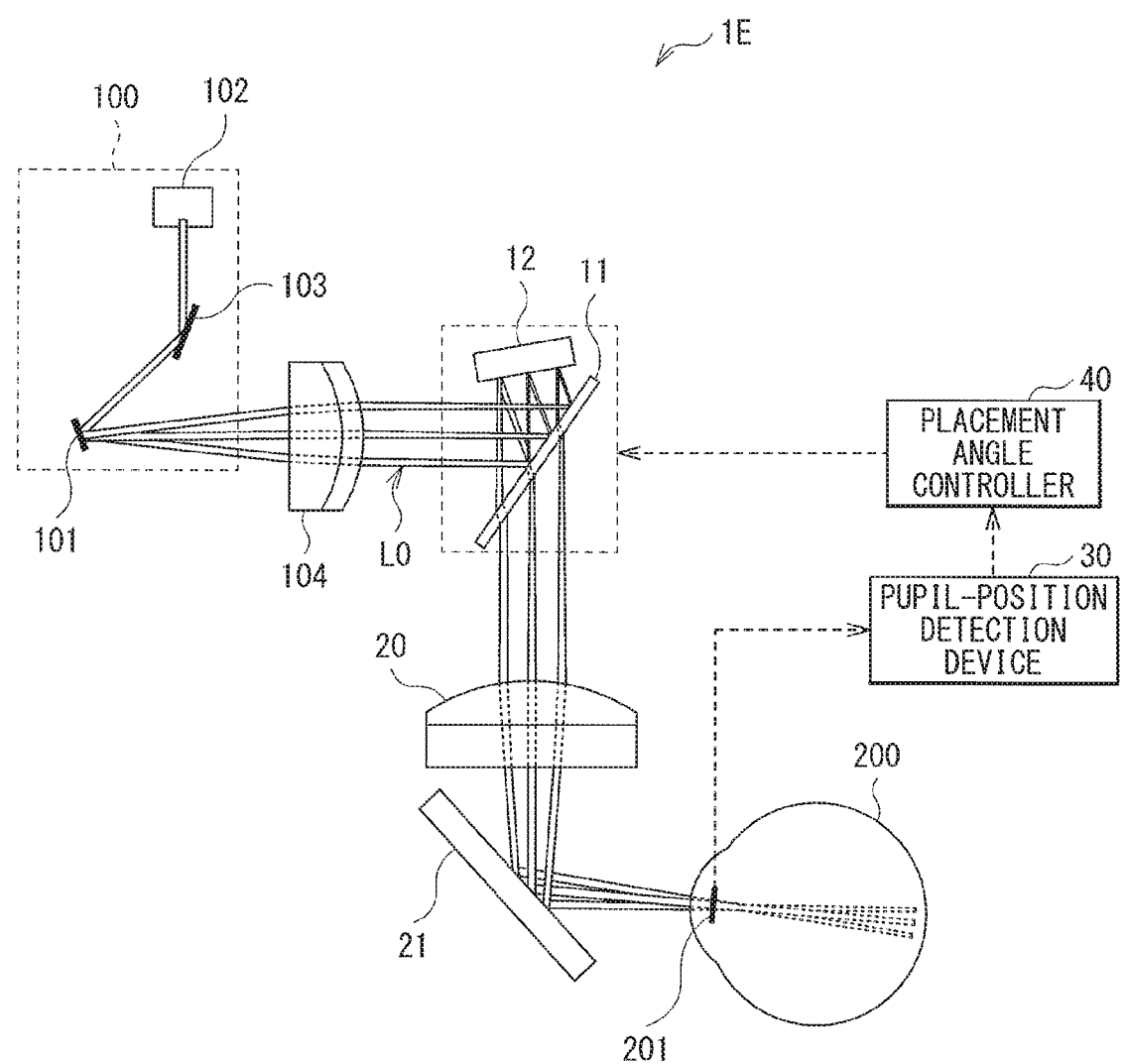
FIG. 12 is a configuration diagram that roughly illustrates an example of a configuration of an image display apparatus according to a second embodiment.

FIG. 12 roughly illustrates an example of a configuration of an image display apparatus 1E according to the second embodiment of the present disclosure.

The image display apparatus 1E illustrated in FIG. 12 has a configuration different from the configuration of the image display apparatus 1 in FIG. 1 in a placement positional relationship between the first reflection element 11 and the second reflection element 12.

In the second embodiment, the second reflection element 12 is disposed on a first reflection optical path of the image light L0, the image light L0 having been emitted from the image light generator 100 and having been reflected by the first reflection element 11. The first reflection element 11 is disposed to transmit, toward the light-condensing optical system 20, the image light L0 that has been reflected by the second reflection element 12 and has re-entered the first reflection element 11.

(Example of Control of Placement Angle)

Figure 13:
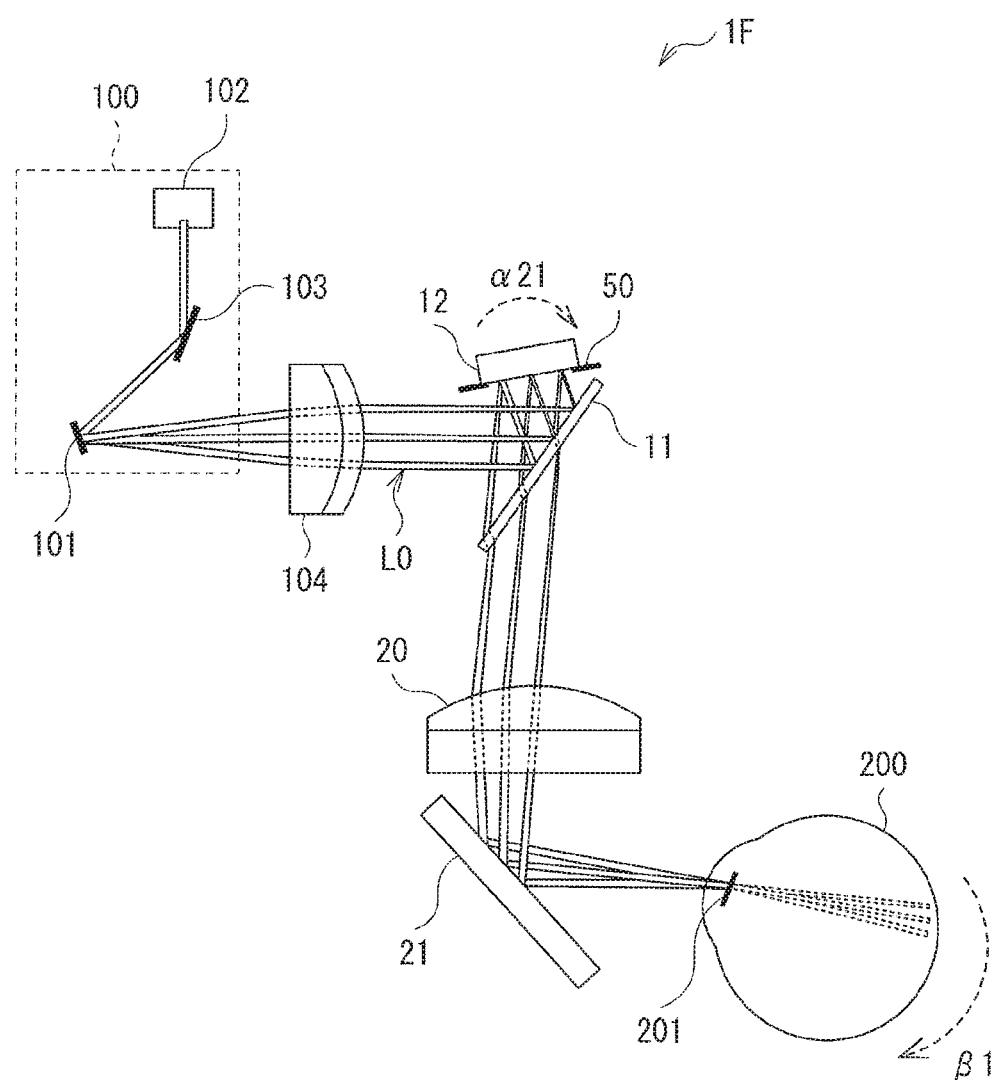
FIG. 13 is a configuration diagram that roughly illustrates an example of varying the placement angle of the second reflection element in a first direction in the image display apparatus according to the second embodiment.
Figure 14:
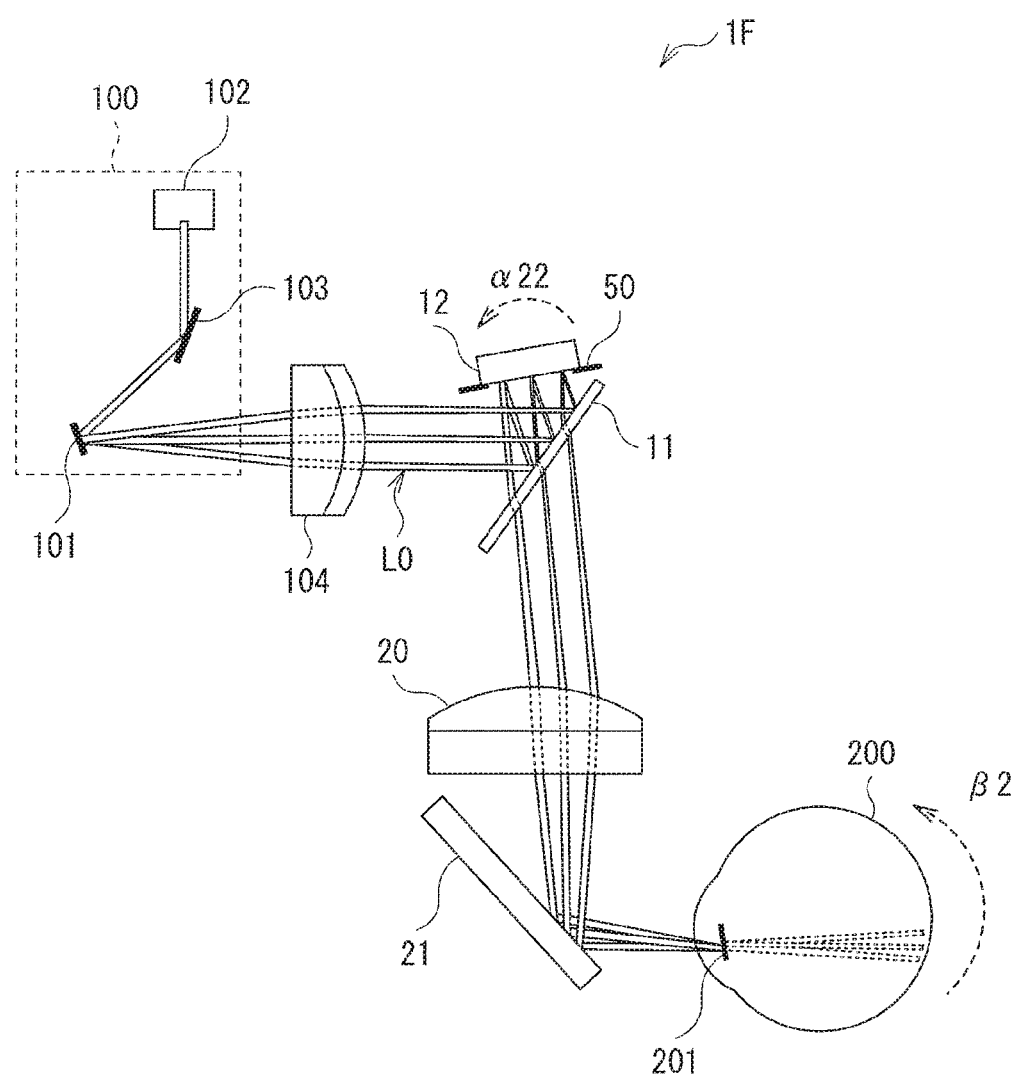
FIG. 14 is a configuration diagram that roughly illustrates an example of varying the placement angle of the second reflection element in a second direction in the image display apparatus according to the second embodiment.

FIGS. 13 and 14 each illustrate an example in which the second reflection element 12 has a variable placement angle in the image display apparatus 1E in FIG. 12.

In an image display apparatus 1F illustrated in FIGS. 13 and 14, the placement angle controller 40 controls the placement angle of the second reflection element 12 to cause the image light L0 to enter the pupil 201 of the observer irrespective of variation in the position of the pupil of the observer.

For example, as illustrated in FIG. 13, in a case where the eyeball 200 of the observer varies in the direction β1 and the position of the pupil varies upwardly, the placement angle controller 40 causes the placement angle of the second reflection element 12 to vary in a first direction α21 associated with the direction β1 of the variation in the position of the pupil.

In addition, as illustrated in FIG. 14, in a case where the eyeball 200 of the observer varies in the direction β2 and the position of the pupil varies downwardly, the placement angle controller 40 causes the placement angle of the second reflection element 12 to vary in a second direction α22 associated with the direction β2 of the variation in the position of the pupil.

Figure 15:
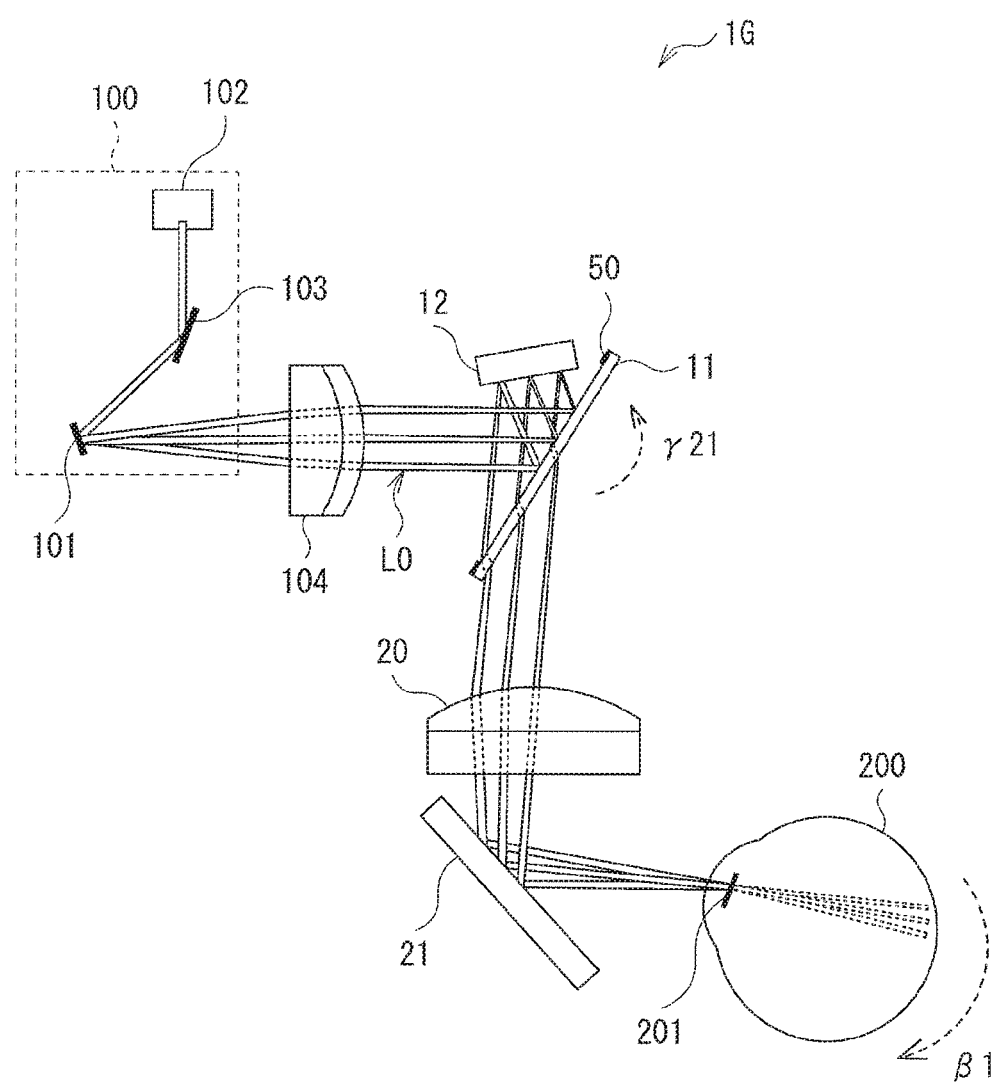
FIG. 15 is a configuration diagram that roughly illustrates an example of varying the placement angle of the first reflection element in the second direction in the image display apparatus according to the second embodiment.
Figure 16:
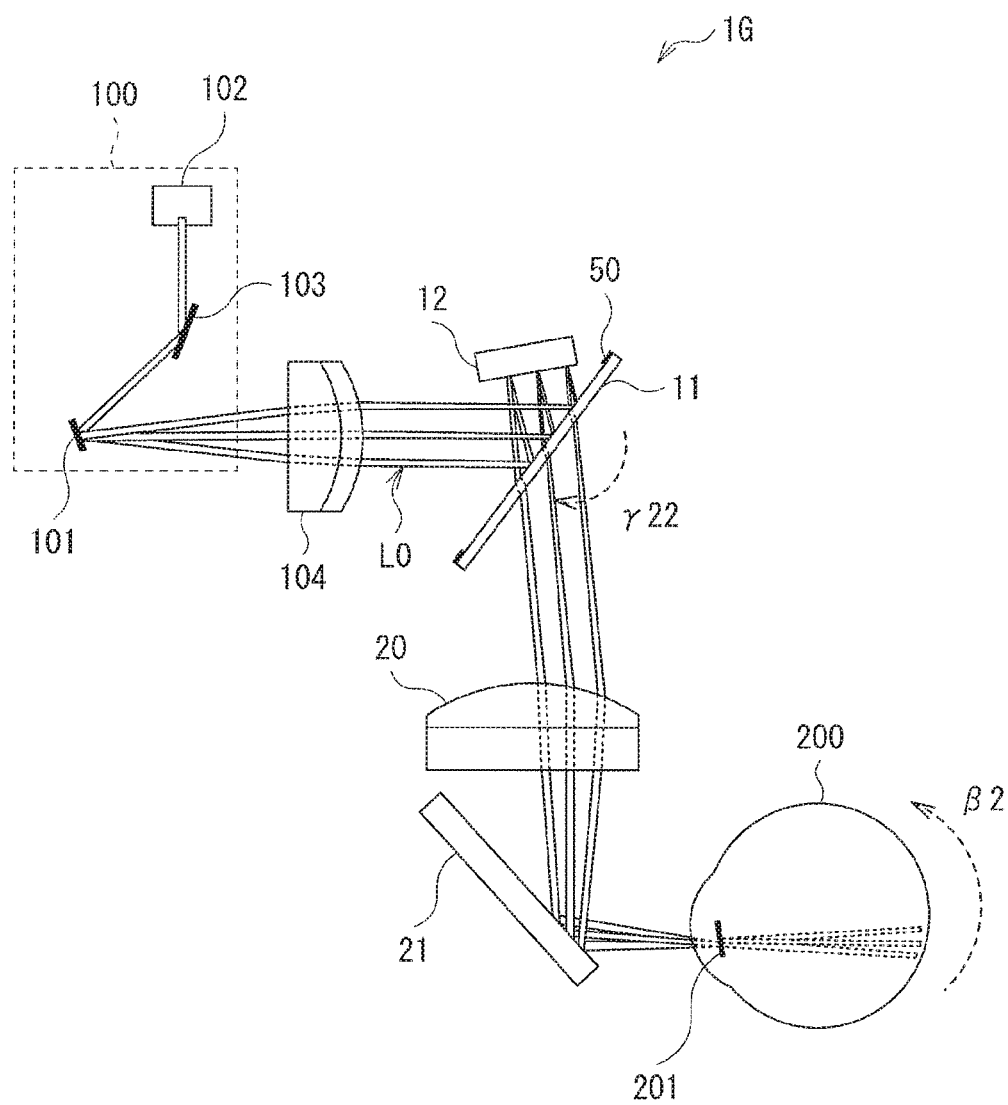
FIG. 16 is a configuration diagram that roughly illustrates a second example of varying a placement angle of a reflection element in the image display apparatus according to the second embodiment.

FIGS. 15 and 16 each illustrate an example in which the first reflection element 11 has a variable placement angle in the image display apparatus 1E in FIG. 12.

In an image display apparatus 1G illustrated in FIGS. 15 and 16, the placement angle controller 40 controls the placement angle of the first reflection element 11 to cause the image light L0 to enter the pupil 201 of the observer irrespective of variation in the position of the pupil of the observer.

For example, as illustrated in FIG. 15, in a case where the eyeball 200 of the observer varies in the direction β1 and the position of the pupil varies upwardly, the placement angle controller 40 causes the placement angle of the first reflection element 11 to vary in a first direction γ21 associated with the direction β1 of the variation in the position of the pupil.

In addition, as illustrated in FIG. 16, in a case where the eyeball 200 of the observer varies in the direction β2 and the position of the pupil varies downwardly, the placement angle controller 40 causes the placement angle of the first reflection element 11 to vary in a second direction γ22 associated with the direction β2 of the variation in the position of the pupil.

It is to be noted that in FIGS. 13 to 16, the position of the pupil may vary not only within a paper surface but also in a direction that intersects with the paper surface. In this case, the placement angle of the first reflection element 11 or the second reflection element 12 may be varied in the direction that intersects with the paper surface, in accordance with the direction of the variation in the position of the pupil.

In addition, the first reflection element 11 and the second reflection element 12 may each have a variable placement angle. The placement angle controller 40 may control the placement angles of both the first reflection element 11 and the second reflection element 12 to cause the image light L0 to enter the pupil 201 of the observer irrespective of variation in the position of the pupil of the observer.

(Spread Angle of Image Light)

As with the first embodiment, in the image display apparatus 1E according to the second embodiment, it is preferable that the image light L0 at the position of the pupil of the observer be close to a parallel beam toward the pupil 201 of the observer or a diverging beam toward the pupil 201 of the observer.

In addition, it is preferable to adjust the beam waist position of the image light L0 as follows. Thus, as with the foregoing first embodiment, it is preferable to adjust the spread angle θ of the image light L0 to be within the range of Expression (1) or (1)'.

As illustrated in FIGS. 13 and 14, in a case of the second reflection element 12 having a variable placement angle, it is preferable that the second reflection element 12 be disposed in a vicinity of a focal surface on image light generator 100 side in the light-condensing optical system 20. The focal surface on the image light generator 100 side in the light-condensing optical system 20 corresponds to the aperture stop position 50. In this case, in the optical path of the image light L0 after being reflected by the second reflection element 12, it is preferable that the beam waist position of the image light L0 be at an optical-path position between the second reflection element 12 and the light-condensing optical system 20. Thus, it is preferable that the beam waist position of the image light L0 be in the vicinity of the second reflection element 12 or at a position closer to the pupil in the optical path of the image light L0 after being reflected by the second reflection element 12.

In addition, as illustrated in FIGS. 15 and 16, in a case of the first reflection element 11 having a variable placement angle, it is preferable that the first reflection element 11 be disposed in the vicinity of a focal surface on image light generator 100 side in the light-condensing optical system 20. The focal surface on the image light generator 100 side in the light-condensing optical system 20 corresponds to the aperture stop position 50. In this case, in the optical path of the image light L0, the image light L0 having been emitted from the image light generator 100 and having entered the first reflection element 11, it is preferable that the beam waist position of the image light L0 be at an optical-path position between the first reflection element 11 and the light-condensing optical system 20. Thus, it is preferable that the beam waist position of the image light L0 be in the vicinity of the first reflection element 11 or at a position closer to the pupil in the optical path of the image light L0 after being reflected by the first reflection element 11.

Other configuration, operation, and effects may be approximately similar to those of the image display apparatus according to the foregoing first embodiment.

3. Third Embodiment

Next, an image display apparatus according to a third embodiment of the present disclosure is described. It is to be noted that in the following, the same reference numerals are assigned to approximately the same components as those in the image display apparatus according to the foregoing first and second embodiments, and descriptions thereof are omitted where appropriate.

Figure 17:
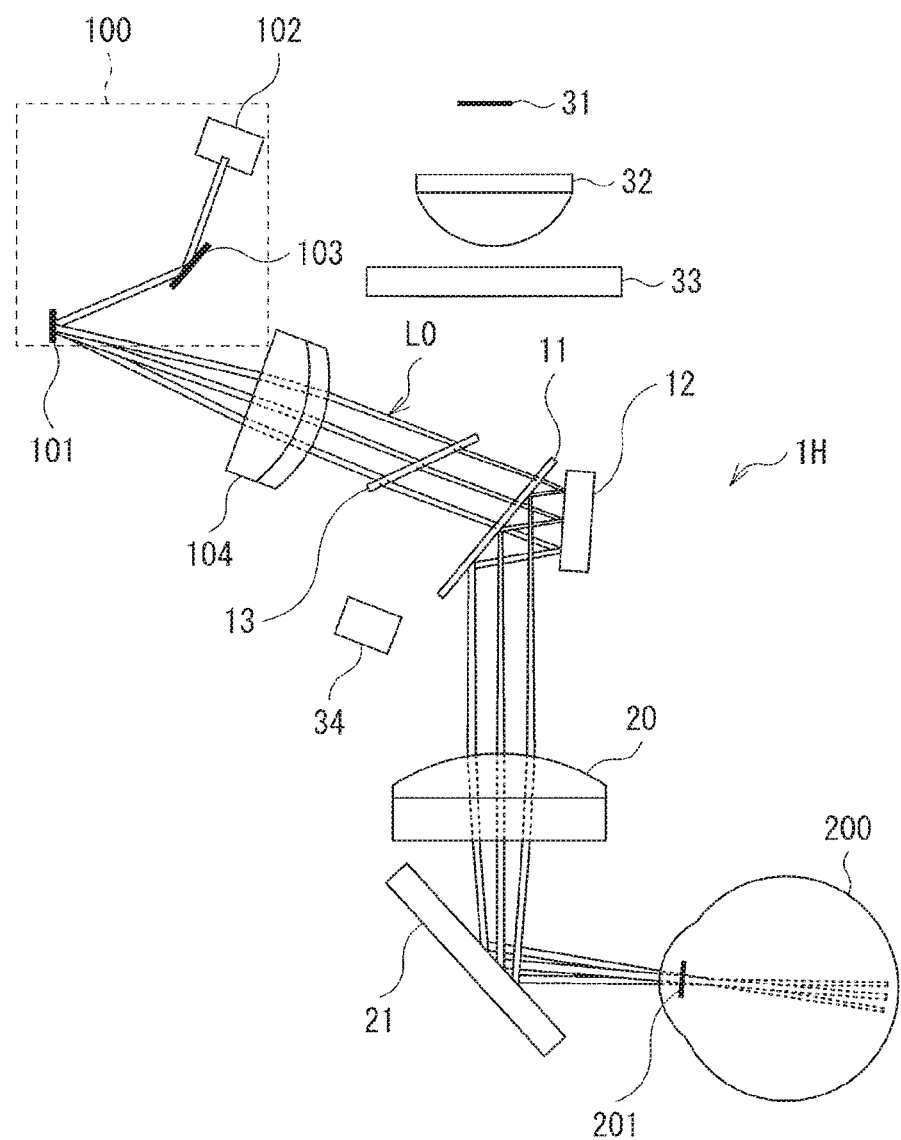
FIG. 17 is a configuration diagram that illustrates an example of a configuration of an image display apparatus according to a third embodiment along with an optical path of image light.
Figure 18:
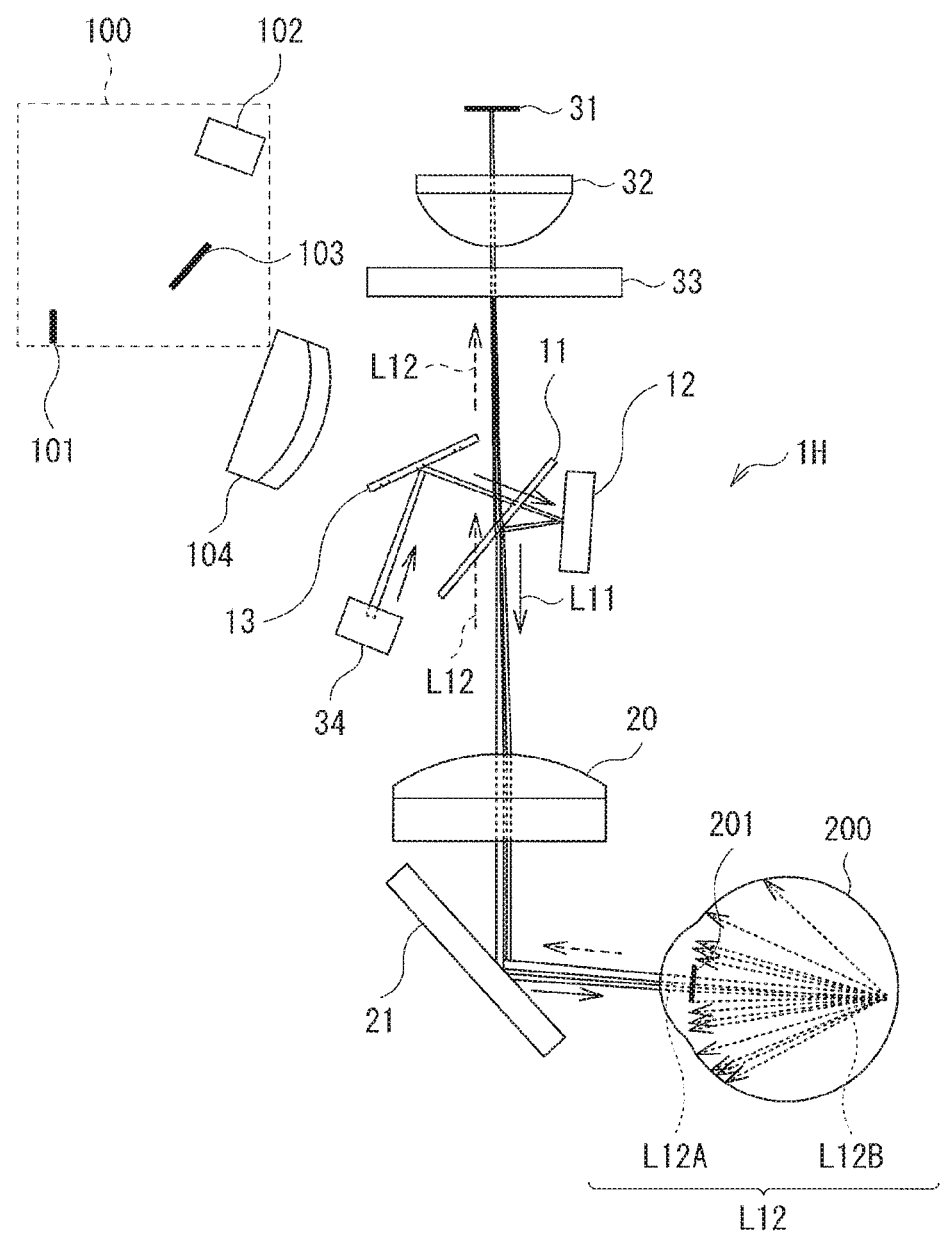
FIG. 18 is a configuration diagram that illustrates an example of the configuration of the image display apparatus according to the third embodiment along with an optical path of illumination light for detecting a position of a pupil.

FIGS. 17 and 18 each illustrate an example of a configuration of an image display apparatus 1H according to the third embodiment. In the image display apparatus 1 illustrated in FIG. 1, the pupil-position detection device 30 includes a detection optical system and the detection element 31 for detecting the position of the pupil of the observer. The image display apparatus 1H according to the third embodiment illustrates an example of a configuration that includes, in addition to the example of the configuration of the image display apparatus 1 illustrated in FIG. 1, the detection optical system and the detection element 31 in the pupil-position detection device 30. The configuration except for the detection optical system and the detection element 31 is approximately similar to that of the image display apparatus 1 illustrated in FIG. 1.

FIG. 17 illustrates an example of a configuration of the image display apparatus 1H along with an optical path of the image light L0. FIG. 18 illustrates an example of the configuration of the image display apparatus 1H along with an optical path of illumination light L11 used for detecting the position of the pupil.

The detection optical system includes a third reflection element 13, an imaging lens 32, a wavelength cut filter 33, and an illumination light source 34.

The illumination light source 34 emits the illumination light L11 used for detecting the position of the pupil of the observer. For example, the illumination light L11 is infrared light. For example, the illumination light source 34 is an IR (infrared) laser diode that emits infrared light.

The third reflection element 13 is a half mirror, and reflects the illumination light L11 emitted from the illumination light source 34, to cause the illumination light L11 to enter the first reflection element 11. In addition, the third reflection element 13 transmits the image light L0. The illumination light L11 that has entered the first reflection element 11 proceeds on approximately the same optical path as that of the image light L0, and the position of the pupil of the observer (eyeball 200) is irradiated with the illumination light L11. As with the converging position of the image light L0, controlling the placement angle of the first reflection element 11, the second reflection element 12, or both adjusts an irradiation position of the illumination light L11 following the variation in the position of the pupil of the observer.

The illumination light L11 is reflected at the eyeball 200, to generate eyeball-reflected light L12. The eyeball-reflected light L12 includes cornea-reflected light L12A and retina-reflected light L12B.

The detection element 31 is disposed on a second transmission optical path of the eyeball-reflected light L12, the eyeball-reflected light L12 having been reflected by the eyeball 200 of the observer, having traveled back through the light-condensing optical system 20, and having transmitted through the first reflection element 11; thus, the detection element 31 detects the eyeball-reflected light L12. On the second transmission optical path between the first reflection element 11 and the detection element 31, the wavelength cut filter 33 and the imaging lens 32 are disposed.

The wavelength cut filter 33 is a filter that cuts off light having a wavelength band other than the wavelength band of the illumination light L11, and is a visible light cut filter, for example.

The placement angle controller 40 controls the placement angle of the first reflection element 11, the second reflection element 12, or both on the basis of the position of the pupil of the observer, which is obtained on the basis of a result of the detection of the eyeball-reflected light L12 by the detection element 31.

(Specific Example of Detection Result)

Figure 19:
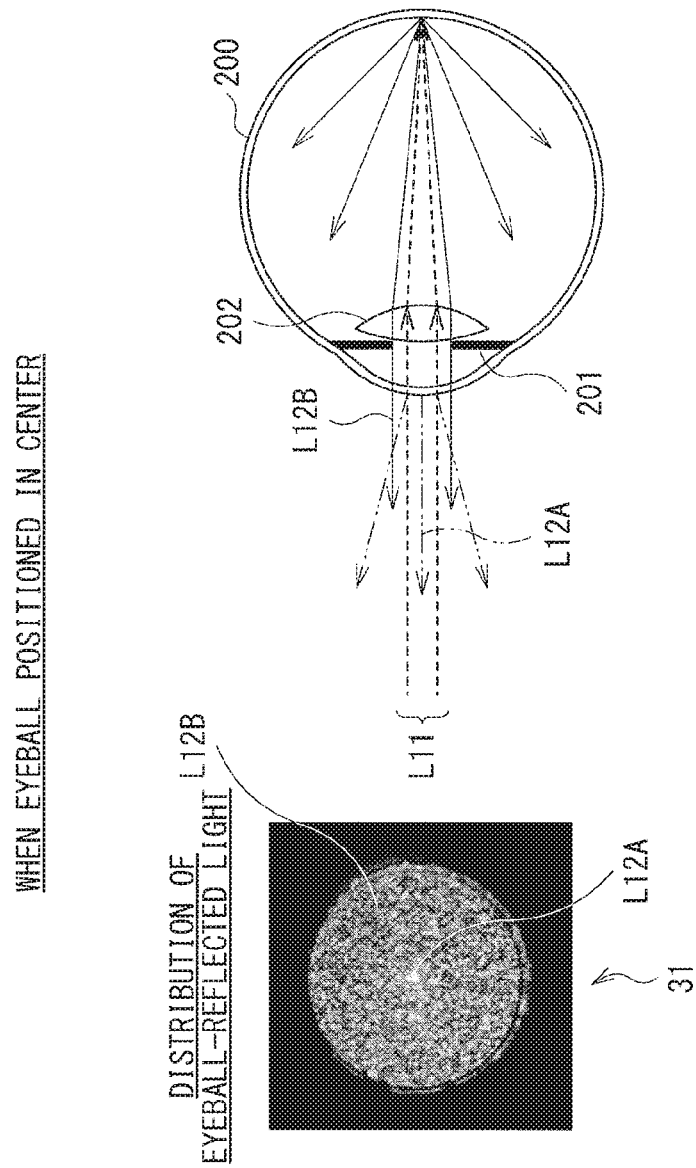
FIG. 19 is an explanatory diagram that illustrates a first example of a distribution of eyeball-reflected light detected by a detection element in the image display apparatus according to the third embodiment.
Figure 20:
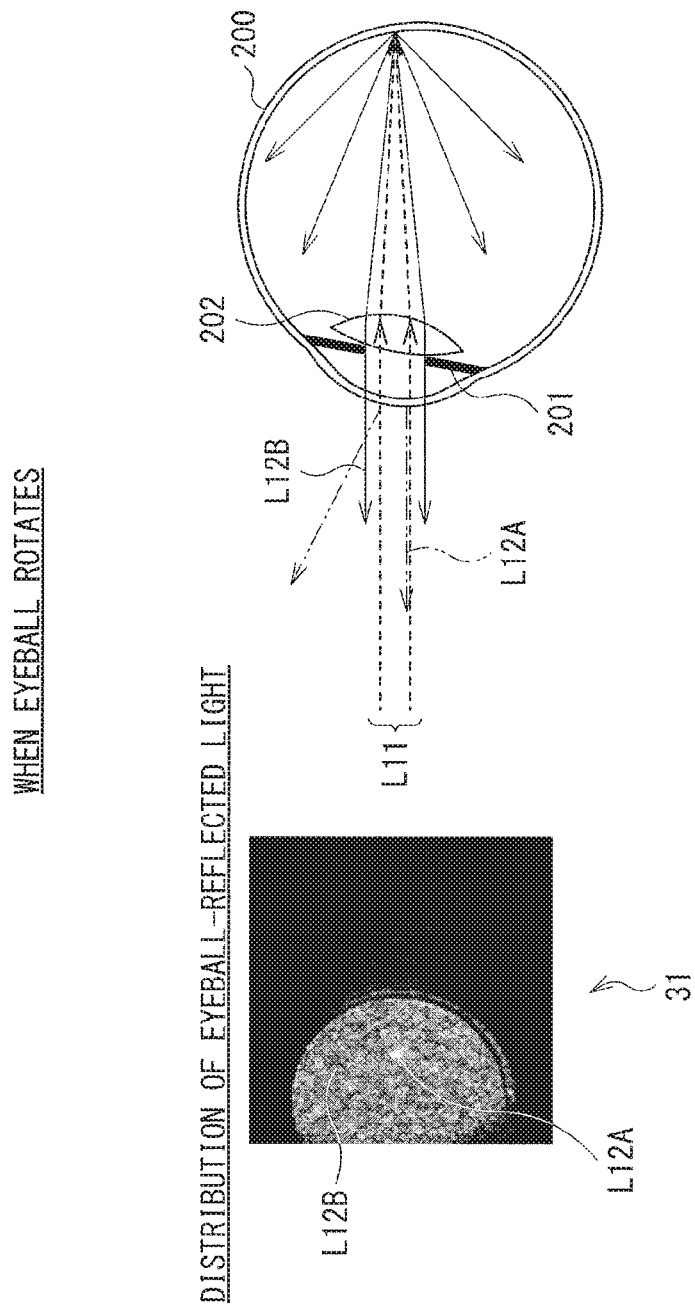
FIG. 20 is an explanatory diagram that illustrates a second example of the distribution of the eyeball-reflected light detected by the detection element in the image display apparatus according to the third embodiment.

FIG. 19 illustrates a first example of a distribution of the eyeball-reflected light L12 detected by the detection element 31 in the image display apparatus 1H according to the third embodiment. FIG. 20 illustrates a second example of the distribution of the eyeball-reflected light L12 detected by the detection element 31 in the image display apparatus 1H according to the third embodiment. FIG. 19 illustrates an example of the distribution of the eyeball-reflected light L12 in a case where the pupil (eyeball 200) is positioned in the center. FIG. 20 illustrates an example of the distribution of the eyeball-reflected light L12 in a case where the position of the pupil (eyeball 200) is rotated from the center.

Out of the eyeball-reflected light L12, the retina-reflected light L12B is light diffused at the retina. The retina-reflected light L12B is refracted by the crystalline lens 202 into a state close to parallel light, and proceeds toward the detection element 31. On the detection element 31, an image formed by the retina-reflected light L12B is observed in a whole region corresponding to a size of the pupil 201.

In contrast, the cornea-reflected light L12A out of the eyeball-reflected light L12 is observed on the detection element 31, as an image of a minimum region (Purkinje image) formed by regular reflection light from a cornea.

As illustrated in FIGS. 19 and 20, the position of the image observed by the detection element 31 differs depending on the difference in the position of the pupil. This makes it possible to detect the position of the pupil on the basis of the result of the detection by the detection element 31.

Other configuration, operation, and effects may be approximately similar to those of the image display apparatus according to the foregoing first embodiment.

Modification Example

FIGS. 21 and 22 each illustrate an example of a configuration of an image display apparatus 1I according to a modification example of the third embodiment. The image display apparatus 1I according to the modification example is partially different from the example of the configuration of the image display apparatus 1H illustrated in FIGS. 17 and 18 in the placement of the image light generator 100 and the detection optical system. FIG. 21 illustrates an example of the configuration of the image display apparatus 1I according to the modification example along with an optical path of the image light L0. FIG. 22 illustrates an example of the configuration of the image display apparatus 1I according to the modification example along with an optical path of the illumination light L11 used for detecting the position of the pupil.

In the image display apparatus 1I according to the modification example, the third reflection element 13 is disposed to transmit, toward the first reflection element 11, the illumination light L11 emitted from the illumination light source 34. In addition, the third reflection element 13 is disposed to reflect, toward the first reflection element 11, the image light L0 emitted from the image light generator 100.

Other configuration and operation may be approximately similar to those of the image display apparatus 1H illustrated in FIGS. 17 and 18.

4. Fourth Embodiment

Next, an image display apparatus according to a fourth embodiment of the present disclosure is described. It is to be noted that in the following, the same reference numerals are assigned to approximately the same components as those in the image display apparatus according to any one of the foregoing first to third embodiments, and descriptions thereof are omitted where appropriate.

FIGS. 23 and 24 each illustrate an example of a configuration of an image display apparatus 1J according to the fourth embodiment. The image display apparatus 1J according to the fourth embodiment illustrates an example of a configuration that includes, in addition to the example of the configuration of the image display apparatus 1E (FIG. 12) according to the second embodiment, the detection optical system and the detection element 31 in the pupil-position detection device 30. The configuration except for the detection optical system and the detection element 31 is approximately similar to that of the image display apparatus 1E according to the second embodiment.

FIG. 23 illustrates an example of the configuration of the image display apparatus J along with an optical path of the image light L0. FIG. 24 illustrates an example of the image display apparatus J along with an optical path of the illumination light L11 used for detecting the position of the pupil.

The detection optical system includes the third reflection element 13, the imaging lens 32, the wavelength cut filter 33, and the illumination light source 34.

The illumination light source 34 emits the illumination light L11 used for detecting the position of the pupil of the observer. For example, the illumination light L11 is infrared light. For example, the illumination light source 34 is an IR (infrared) laser diode that emits infrared light.

The third reflection element 13 is a half mirror, and reflects the illumination light L11 emitted from the illumination light source 34, to cause the illumination light L11 to enter the first reflection element 11. In addition, the third reflection element 13 transmits the image light L0. The illumination light L11 that has entered the first reflection element 11 proceeds on approximately the same optical path as that of the image light L0, and the position of the pupil of the observer (eyeball 200) is irradiated with the illumination light L11. As with the converging position of the image light L0, controlling the placement angle of the first reflection element 11, the second reflection element 12, or both adjusts the irradiation position of the illumination light L11 following the variation in the position of the pupil of the observer.

The illumination light L11 is reflected at the eyeball 200, to generate the eyeball-reflected light L12. The eyeball-reflected light L12 includes the cornea-reflected light L12A and the retina-reflected light L12B.

The detection element 31 is disposed on the second reflection optical path of the eyeball-reflected light L12, the eyeball-reflected light L12 having been reflected by the eyeball 200 of the observer, having traveled back through the light-condensing optical system 20, and having been reflected by the first reflection element 11; thus, the detection element 31 detects the eyeball-reflected light L12. On the second reflection optical path between the first reflection element 11 and the detection element 31, the wavelength cut filter 33 and the imaging lens 32 are disposed.

The wavelength cut filter 33 is a filter that cuts off light having a wavelength band other than the wavelength band of the illumination light L11, and is a visible light cut filter, for example.

The placement angle controller 40 controls the placement angle of the first reflection element 11, the second reflection element 12, or both on the basis of the position of the pupil of the observer, which is obtained on the basis of the result of the detection of the eyeball-reflected light L12 by the detection element 31.

Other configuration, operation, and effects may be approximately similar to those of the image display apparatus according to the foregoing second embodiment. In addition, the distribution of the eyeball-reflected light L12 detected by the detection element 31 may be approximately similar to that of the image display apparatus according to the foregoing third embodiment.

5. Other Embodiments

The technique according to the present disclosure is not limited to the description of any of the foregoing embodiments, and various modifications are possible.

For example, the present technology may have the following configurations. According to the present technology having the following configuration, the placement angle of the first reflection element, the second reflection element, or both is controlled on the basis of the position of the pupil of the observer, the first reflection element, the second reflection element, or both being disposed on the optical path of the image light after being emitted from the image light generator. Therefore, it is possible to achieve compactness and to guide the image light to the pupil irrespective of a movement in the position of the pupil of the observer.

(1)

An image display apparatus, including:

an image light generator that emits image light;

a first reflection element that the image light from the image light generator is to enter, the first reflection element having a transmitting action and a reflecting action on the image light;

a second reflection element that reflects, toward the first reflection element, the image light that has entered via the first reflection element and causes the image light to re-enter the first reflection element, the second reflection element having a reflecting action on the image light;

a light-condensing optical system that converges, toward a position of a pupil of an observer, the image light that has re-entered the first reflection element; and a controller that controls a placement angle of the first reflection element, the second reflection element, or both on a basis of the position of the pupil of the observer.

(2)

The image display apparatus according to (1), in which
the second reflection element is disposed on a first transmission optical path of the image light, the image light having emitted from the image light generator and having transmitted through the first reflection element, and
the first reflection element is disposed to reflect the image light toward the light-condensing optical system, the image light being reflected by the second reflection element and re-entering the first reflection element.

(3)

The image display apparatus according to (2), in which
the placement angle of the second reflection element is variable, and
the controller controls the placement angle of the second reflection element, to cause the image light to enter the pupil of the observer irrespective of variation in the position of the pupil of the observer.

(4)

The image display apparatus according to (2), in which
the placement angle of the first reflection element is variable, and
the controller controls the placement angle of the first reflection element, to cause the image light to enter the pupil of the observer irrespective of variation in the position of the pupil of the observer.

(5)

The image display apparatus according to (1), in which
the second reflection element is disposed on a first reflection optical path of the image light, the image light having emitted from the image light generator and having reflected by the first reflection element, and
the first reflection element is disposed to transmit the image light toward the light-condensing optical system, the image light being reflected by the second reflection element and re-entering the first reflection element.

(6)

The image display apparatus according to (5), in which
the placement angle of the second reflection element is variable, and
the controller controls the placement angle of the second reflection element, to cause the image light to enter the pupil of the observer irrespective of variation in the position of the pupil of the observer.

(7)

The image display apparatus according to (5), in which
the placement angle of the first reflection element is variable, and
the controller controls the placement angle of the first reflection element, to cause the image light to enter the pupil of the observer irrespective of variation in the position of the pupil of the observer.

(8)

The image display apparatus according to (1), (2), (3), (5), or (6), in which
the second reflection element is disposed in a vicinity of a focal surface on image light generator side in the light-condensing optical system, and the placement angle of the second reflection element is variable,
the controller is caused to control the placement angle of the second reflection element on a basis of the position of the pupil of the observer, and
in an optical path of the image light after being reflected by the second reflection element, a beam waist position of the image light is located at an optical-path position between the second reflection element and the light-condensing optical system.

(9)

The image display apparatus according to (8), in which
in the optical path of the image light, the image light having been reflected by the second reflection element, the beam waist position of the image light is caused to vary between the second reflection element and the light-condensing optical system in accordance with a visual distance from the observer.

(10)

The image display apparatus according to (1), (2), (4), (5), or (7), in which
the first reflection element is disposed in a vicinity of a focal surface on image light generator side in the light-condensing optical system, and the placement angle of the first reflection element is variable,
the controller is caused to control the placement angle of the first reflection element on a basis of the position of the pupil of the observer, and
in an optical path of the image light after entering the first reflection element from the image light generator, a beam waist position of the image light is at an optical-path position between the first reflection element and the light-condensing optical system.

(11)

The image display apparatus according to (10), in which
in the optical path of the image light, the image light having been emitted from the image light generator and having entered the first reflection element, the beam waist position of the image light is caused to vary between the first reflection element and the light-condensing optical system in accordance with a visual distance from the observer.

(12)

The image display apparatus according to any one of (1) to (11), in which
the image light at the position of the pupil of the observer is a parallel beam toward the pupil of the observer or a diverging beam toward the pupil of the observer.

(13)

The image display apparatus according to any one of (1) to (11), in which
a spread angle θ of the image light at the position of the pupil of the observer is within a range of the following Expression (1), $$-0.06° < \theta < 0.6° \qquad (1)$$

where the spread angle θ is positive in a case of diverging toward the pupil of the observer, and that the spread angle θ is negative in a case of converging toward the pupil of the observer.

(14)

The image display apparatus according to (13), in which
the image light generator includes
a light source that emits light, and
a scanning mirror that scans the light from the light source to generate the image light, and
the spread angle θ of the image light is adjustable by varying a position on an optical path of at least one of the light source, the scanning mirror, the first reflection element, or the second reflection element.

(15)

The image display apparatus according to any one of (1) to (14), in which
the second reflection element has a reflection functional surface that is a rectangle having a length and a width different from each other,
the first reflection element has a normal line that is inclined centering around an inclination reference axis of the first reflection element, the normal line being inclined with respect to an optical axis of the image light generator, and the reflection functional surface has a long side approximately parallel to the inclination reference axis.

(16)

The image display apparatus according to any one of (1) to (15), in which the second reflection element has a reflection functional surface that is a rectangle having a length and a width different from each other, the first reflection element has a normal line that is inclined centering around an inclination reference axis of the first reflection element, the normal line being inclined with respect to an entering optical axis of the light-condensing optical system, and the reflection functional surface has a long side approximately parallel to the inclination reference axis.

(17)

The image display apparatus according to any one of (2) to (4), further including:

an illumination light source that emits illumination light for detecting the position of the pupil of the observer; and a detection element that detects reflection light of the illumination light, the detection element being disposed on a second transmission optical path of the reflection light of the illumination light, the reflection light of the illumination light having been reflected by an eyeball of the observer, having traveled back through the light-condensing optical system, and having transmitted through the first reflection element, wherein the controller controls the placement angle of the first reflection element, the second reflection element, or both on the basis of the position of the pupil of the observer, the position being obtained on a basis of a result of the detection of the reflection light by the detection element.

(18)

The image display apparatus according to (17), further including a filter that cuts light having a wavelength band other than the wavelength band of the illumination light, the filter being disposed on the second transmission optical path between the detection element and the first reflection element.

(19)

The image display apparatus according to any one of (5) to (7), further including:

an illumination light source that emits illumination light for detecting the position of the pupil of the observer; and a detection element that detects reflection light of the illumination light, the detection element being disposed on a second reflection optical path of the reflection light of the illumination light, the reflection light of the illumination light having been reflected by an eyeball of the observer, having traveled back through the light-condensing optical system, and having been reflected by the first reflection element, wherein the controller controls the placement angle of the first reflection element, the second reflection element, or both on the basis of the position of the pupil of the observer, the position being obtained on a basis of a result of the detection of the reflection light by the detection element.

(20)

The image display apparatus according to (19), further including a filter that cuts light having a wavelength band other than the wavelength band of the illumination light, the filter being disposed on the second reflection optical path between the detection element and the first reflection element.

The present application claims the priority on the basis of Japanese Patent Application No. 2017-240269 filed on Dec. 15, 2017 with Japan Patent Office, the entire contents of which are incorporated in the present application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image display apparatus, comprising:
an image light generator configured to emit image light;
a first reflection element configured to receive the image light from the image light generator, wherein the first reflection element has a transmitting action and a reflecting action on the image light; and
a placement angle of the first reflection element is variable to direct the image light to a pupil of an observer;
a second reflection element configured to reflect, toward the first reflection element, the image light that has entered via the first reflection element and cause the image light to re-enter the first reflection element, wherein the second reflection element has the reflecting action on the image light, and
the second reflection element is on an optical path through which the image light passes;
a light-condensing optical system configured to converge, toward a position of the pupil of the observer, the image light that has re-entered the first reflection element; and
a controller configured to control at least one of the placement angle of the first reflection element or a placement angle of the second reflection element based on the position of the pupil of the observer.

2. The image display apparatus according to claim 1, wherein
the placement angle of the second reflection element is variable, and
the controller is further configured to control the placement angle of the second reflection element, to cause the image light to enter the pupil of the observer.

3. The image display apparatus according to claim 1, wherein
the second reflection element is on a first reflection optical path of the image light, which is emitted from the image light generator and reflected by the first reflection element,
the image light is further reflected by the second reflection element and re-enters the first reflection element, and
the first reflection element is disposed to transmit the re-entered image light toward the light-condensing optical system.

4. The image display apparatus according to claim 3, wherein
the placement angle of the second reflection element is variable, and
the controller is further configured to control the placement angle of the second reflection element, to cause the image light to enter the pupil of the observer.

5. The image display apparatus according to claim 3, further comprising:
an illumination light source configured to emit illumination light for detection of the position of the pupil of the observer; and
a detection element configured to detect reflection light of the illumination light, wherein the detection element is on a second reflection optical path of the reflection light of the illumination light, the reflection light of the illumination light is reflected by an eyeball of the observer, travels back through the light-condensing optical system, and is reflected by the first reflection element, the controller is further configured to control the placement angle of at least one of the first reflection element or the second reflection element, based on the position of the pupil of the observer, and the position is obtained based on a result of the detection of the reflection light by the detection element.

6. The image display apparatus according to claim 5, further comprising a filter configured to cut light having a wavelength band other than the wavelength band of the illumination light, wherein the filter is on the second reflection optical path between the detection element and the first reflection element.

7. The image display apparatus according to claim 1, wherein the second reflection element is in a vicinity of a focal surface on image light generator side in the light-condensing optical system, the placement angle of the second reflection element is variable, the controller is further configured to control the placement angle of the second reflection element based on a basis of the position of the pupil of the observer, and in the optical path of the image light after being reflected by the second reflection element, a beam waist position of the image light is located at an optical-path position between the second reflection element and the light-condensing optical system.

8. The image display apparatus according to claim 7, wherein in the optical path of the image light, which is reflected by the second reflection element, the beam waist position of the image light is caused to vary between the second reflection element and the light-condensing optical system in accordance with a visual distance from the observer.

9. The image display apparatus according to claim 1, wherein the first reflection element is in a vicinity of a focal surface on image light generator side in the light-condensing optical system, the controller is further configured to control the placement angle of the first reflection element based on the position of the pupil of the observer, and in the optical path of the image light after entering the first reflection element from the image light generator, a beam waist position of the image light is at an optical-path position between the first reflection element and the light-condensing optical system.

10. The image display apparatus according to claim 9, wherein in the optical path of the image light, which is emitted from the image light generator and enters the first reflection element, the beam waist position of the image light is caused to vary between the first reflection element and the light-condensing optical system in accordance with a visual distance from the observer.

11. The image display apparatus according to claim 1, wherein the image light at the position of the pupil of the observer is one of a parallel beam toward the pupil of the observer or a diverging beam toward the pupil of the observer.

12. The image display apparatus according to claim 1, wherein a spread angle θ of the image light at the position of the pupil of the observer is within a range of the following Expression (1):

$$-0.06° < \theta < 0.6° \quad \ldots (1)$$

where the spread angle θ is positive in a case of diverging toward the pupil of the observer, and the spread angle θ is negative in a case of converging toward the pupil of the observer.

13. The image display apparatus according to claim 12, wherein the image light generator includes:
a light source configured to emit light; and
a scanning mirror configured to scan the light from the light source to generate the image light, and the spread angle θ of the image light is adjustable by variation of a position on an optical path of at least one of the light source, the scanning mirror, the first reflection element, or the second reflection element.

14. The image display apparatus according to claim 1, wherein the second reflection element has a reflection functional surface that is a rectangle having a length and a width, the length is different from the width, the first reflection element has a normal line that is inclined centering around an inclination reference axis of the first reflection element, the normal line is inclined with respect to an optical axis of the image light generator, and the reflection functional surface has a long side approximately parallel to the inclination reference axis.

15. The image display apparatus according to claim 1, wherein the second reflection element has a reflection functional surface that is a rectangle having a length and a width, the length is different from the width, the first reflection element has a normal line that is inclined centering around an inclination reference axis of the first reflection element, the normal line is inclined with respect to an entering optical axis of the light-condensing optical system, and the reflection functional surface has a long side approximately parallel to the inclination reference axis.

16. The image display apparatus according to claim 1, further comprising:

an illumination light source configured to emit illumination light for detection of the position of the pupil of the observer; and a detection element configured to detect reflection light of the illumination light, wherein the detection element is on a transmission optical path of the reflection light of the illumination light, the reflection light of the illumination light is reflected by an eyeball of the observer, travels back through the light-condensing optical system, and is transmitted through the first reflection element, the controller is further configured to control the placement angle of at least one of the first reflection element or the second reflection element, based on the position of the pupil of the observer, and the position is obtained based on a result of the detection of the reflection light by the detection element.

17. The image display apparatus according to claim 16, further comprising a filter configured to cut light having a wavelength band other than the wavelength band of the illumination light, wherein the filter is on the transmission optical path between the detection element and the first reflection element.

18. The image display apparatus according to claim 1, wherein
the second reflection element is on the optical path of the image light, which is emitted from the image light generator and transmitted through the first reflection element,
the image light is further reflected by the second reflection element and re- enters the first reflection element, and
the first reflection element is disposed to reflect the re-entered image light toward the light-condensing optical system.

19. An image display apparatus, comprising:
an image light generator configured to emit image light;
a first reflection element configured to receive the image light from the image light generator, wherein the first reflection element has a transmitting action and a reflecting action on the image light;
a second reflection element configured to reflect, toward the first reflection element, the image light that has entered via the first reflection element and cause the image light to re-enter the first reflection element, wherein the second reflection element has the reflecting action on the image light;
a light-condensing optical system configured to converge, toward a position of a pupil of an observer, the image light that has re-entered the first reflection element; and
a controller configured to control a placement angle of at least one the first reflection element or the second reflection element based on the position of the pupil of the observer,
wherein a spread angle $\theta$ of the image light at the position of the pupil of the observer is within a range of the following Expression (1):

$-0.06° < \theta < 0.6°$ ... (1)

where the spread angle $\theta$ is positive in a case of diverging toward the pupil of the observer, and the spread angle $\theta$ is negative in a case of converging toward the pupil of the observer.

* * * * *